US006853464B1

(12) United States Patent
Ueda et al.

(10) Patent No.: US 6,853,464 B1
(45) Date of Patent: Feb. 8, 2005

(54) CALIBRATION DATA SETTING DEVICE

(75) Inventors: Masashi Ueda, Nagoya (JP); Masahiro Nishihara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/534,028

(22) Filed: Mar. 24, 2000

(30) Foreign Application Priority Data

Mar. 24, 1999 (JP) .......................................... 11-079883
Mar. 30, 1999 (JP) .......................................... 11-088855
Mar. 31, 1999 (JP) .......................................... 11-092550

(51) Int. Cl.[7] .................................................. G06K 9/00
(52) U.S. Cl. ......................... 358/1.9; 382/162; 382/167
(58) Field of Search ................................ 399/130, 139, 399/151, 182, 31, 49; 358/1.9, 406, 504, 527, 1.16, 3.01, 518; 382/162, 164, 167, 300, 305

(56) References Cited

U.S. PATENT DOCUMENTS 6,473,197 B1 * 10/2002 Shimazaki .................. 358/1.9
6,618,168 B1 * 9/2003 Nakajima et al. .......... 358/1.16

FOREIGN PATENT DOCUMENTS

| | | |
|---|---|---|
| JP | A 63-254888 | 10/1988 |
| JP | A 3-13066 | 1/1991 |
| JP | B2 2755300 | 3/1998 |

* cited by examiner

*Primary Examiner*—Kimberly Williams
*Assistant Examiner*—Thomas J. Lett
(74) *Attorney, Agent, or Firm*—Oliff & Berridge, PLC

(57) ABSTRACT

An operator selects printer characteristics in S201. When a correct calibration file exists (S202:YES), then in S203 calibration data is retrieved from the correct file. When no correct calibration file exists (S202:NO), then in S204 calibration data is retrieved from the reserved file. The reserved file can be a calibration file that is retained when a calibration file is updated or can be a calibration file that is originally provided within the printing system when the printing system is shipped from the factory. When calibration data is retrieved from a correct file or a reserved file, then in S205 original tone levels, included in image data from some upper rank program, are converted into input tone levels, to be applied to the printer, which executes printing accordingly.

22 Claims, 18 Drawing Sheets

FIG.2(b)

| CALIBRATION DATA d6 | |
|---|---|
| ORIGINAL LEVELS Coriginal | INPUT LEVELS Cin |
| 0 | ⋮ |
| ⟆ | ⋮ |
| 255 | ⋮ |

| CALIBRATION DATA d7 | |
|---|---|
| ORIGINAL LEVELS Moriginal | INPUT LEVELS Min |
| 0 | ⋮ |
| ⟆ | ⋮ |
| 255 | ⋮ |

| CALIBRATION DATA d8 | |
|---|---|
| ORIGINAL LEVELS Yoriginal | INPUT LEVELS Yin |
| 0 | ⋮ |
| ⟆ | ⋮ |
| 255 | ⋮ |

| CALIBRATION DATA d9 | |
|---|---|
| ORIGINAL LEVELS Koriginal | INPUT LEVELS Kin |
| 0 | ⋮ |
| ⟆ | ⋮ |
| 255 | ⋮ |

Din – Dout RELATIONSHIP

FIG.6(a)

160

| PATCH NUMBER | NUMERICAL VALUES Rin (RED) | COLORIMETER 1 | COLORIMETER 2 | ··· |
|---|---|---|---|---|
| P1 | 0 | x1, y1 | x1, y1 | ··· |
| ⋮ | ∫ | ∫ | ∫ | ··· |
| P(n/3) | 255 | xn/3, yn/3 | xn/3, yn/3 | ··· |
| PATCH NUMBER | NUMERICAL VALUES Gin (GREEN) | | | |
| P(n/3+1) | 0 | xn/3+1, yn/3+1 | xn/3+1, yn/3+1 | ··· |
| ⋮ | ∫ | ∫ | ∫ | ··· |
| P(2n/3) | 255 | x2n/3, y2n/3 | x2n/3, y2n/3 | ··· |
| PATCH NUMBER | NUMERICAL VALUES Bin (BLUE) | | | |
| P(2n/3+1) | 0 | x2n/3+1, y2n/3+1 | x2n/3+1, y2n/3+1 | ··· |
| ⋮ | ∫ | ∫ | ∫ | ··· |
| P(n) | 255 | x3n, y3n | x3n, y3n | ··· |

FIG.7(a)

142

| | | |
|---|---|---|
| STANDARD DATA (1) | (L*' a*' b*') | STANDARD CALIBRATION DATA REFERENCE NO. (1) |
| STANDARD DATA (2) | (L*'', a*'', b*'') | STANDARD CALIBRATION DATA REFERENCE NO. (2) |
| STANDARD DATA (3) | (L*''', a*''', b*''') | STANDARD CALIBRATION DATA REFERENCE NO. (3) |
| ⋮ | ⋮ | |

FIG.7(b)

STANDARD DATA (1)
(142)

| PATCH NO. | P1 | P2 | | Pn−1 | Pn |
|---|---|---|---|---|---|
| PATCH COORDINATES (x, y) FOR COLORIMETER (1) | x1, y1 | x2, y2 | ... | xn−1, yn−1 | xn, yn |
| L*' | L'1 | L'2 | | L'n−1 | L'n |
| a*' | a'1 | a'2 | | a'n−1 | a'n |
| b*' | b'1 | b'2 | | b'n−1 | b'n |

FIG.7(c)

140

STANDARD CALIBRATION DATA (1)
STANDARD CALIBRATION DATA (2)
STANDARD CALIBRAYION DATA (3)
⋮

FIG.7(d)

140

| CALIBRATION DATA | |
|---|---|
| ORIGINAL LEVELS Roriginal | INPUT LEVELS Rin |
| 0 | ⋮ |
| ∫ | ⋮ |
| 255 | ⋮ |
| CALIBRATION DATA | |
| ORIGINAL LEVELS Goriginal | INPUT LEVELS Gin |
| 0 | ⋮ |
| ∫ | ⋮ |
| 255 | ⋮ |
| CALIBRATION DATA | |
| ORIGINAL LEVELS Boriginal | INPUT LEVELS Bin |
| 0 | ⋮ |
| ∫ | ⋮ |
| 255 | ⋮ |

146

| PATCH NO. | P1 | P2 | | Pn-1 | Pn |
|---|---|---|---|---|---|
| MEASURED VALUE L* | L1 | L2 | ... | Ln-1 | Ln |
| MEASURED VALUE a* | a1 | a2 | | an-1 | an |
| MEASURED VALUE b* | b1 | b2 | | bn-1 | bn |

FIG.11(a)

STANDARD DATA (1) (142)

| PATCH NO. | P1 | ••• | P(n/3) | P(n/3+1) | ••• | P(2n/3) | P(2n/3+1) | ••• | Pn |
|---|---|---|---|---|---|---|---|---|---|
| PATCH COORDINATES (x, y) FOR COLORIMETER (1) | x1, y1 | ••• | xn/3, yn/3 | xn/3+1, yn/3+1 | ••• | x2n/3, y2n/3 | x2n/3+1, y2n/3+1 | ••• | xn, yn |
| DENSITY D (D=R, G, B) | R'1 | ••• | R'n/3 | G'n/3+1 | ••• | G'2n/3 | B'2n/3+1 | ••• | B'n |

FIG.11(b)

146

| PATCH NO. | P1 | ••• | P(n/3) | P(n/3+1) | ••• | P(2n/3) | P(2n/3+1) | ••• | Pn |
|---|---|---|---|---|---|---|---|---|---|
| MEASURED DENSITY D (D=R, G, B) | R1 | ••• | Rn/3 | Gn/3+1 | ••• | G2n/3 | B2n/3+1 | ••• | Bn |

CALIBRATION DATA SETTING DEVICE

BACKGROUND OF THE INVENTION

1. Field of the Invention

The present invention relates to a tone characteristic setting device for setting tone characteristic, such as calibration data, that matches image formation characteristic of an image formation device and that is used by an image processing device to convert image data into image formation data to be supplied to the image formation device.

2. Description of Related Art

Conventionally, to produce desired images using an image formation device, a calibration data setting device sets tone characteristic data, such as calibration data, to convert original tone levels (image data) into input tone levels (image forming data), and inputs the input tone levels to the image foaming device. Based on the converted input tone levels, the image formation device produces the desired images whose tone levels properly match with the original tone levels. The calibration data is preset according to an image forming characteristic of the image formation device.

SUMMARY OF THE INVENTION

If one set of calibration data is fixedly set for being used to convert image data into image formation data, however, images formed by the image forming device may differ from the desired image when the image formation characteristic of the image forming device changes, for example, due to changes in the ambient environment.

It is further noted that the user can normally select a variety of image formation conditions, upon which the image forming device is to be driven. Examples of the image forming conditions include: type of recording medium, type of image forming material, and the recording format used when forming images. Examples of recording medium types include normal recording sheets, coat or glossy sheets that have the surface processed, and overhead projector film. Examples of image forming materials include standard ink and photoink. Examples of recording format includes Bayer type dither pattern and spiral type dither pattern. Thus, the near can select his/her desired image forming conditions and can control the image formation device to form his/her desired image with the selected image forming conditions. To insure that the image forming device can produce the best image for each set of image forming condition, a separate calibration data is preferably set for each different set of image forming conditions.

Additionally, if wrong calibration data is produced during the calibration data setting operation and is stored in a data file, then it becomes impossible to obtain correct calibration data from the data file. Also, if the data file itself is damaged for some reason, then in this case also, it is impossible to obtain correct calibration data from the data file. When one of these situations arises, printing could not be performed until correct calibration data is obtained.

In view of the above-described drawbacks, it is an objective of the present invention to overcome the above-described problem and provide an improved tone characteristic data setting device that can simply and accurately set tone characteristic data, such as calibration data, which is to be used for converting image data into image formation data to be supplied to the image formation device.

The improve tone characteristic setting device enables a user to simply and accurately judge whether tone characteristic data needs to be updated, can easily set tone characteristic data that properly matches the user's newly set image forming condition, or can set allowable tone characteristic data even when proper, correct tone characteristic data is not obtained.

In order to attain the above and other objects, the present invention provides a tone characteristic setting device for setting tone characteristic to be used for converting original tone data into input tone data to be supplied to an image formation device, the tone characteristic setting device comprising: a memory storing data of tone characteristic of an image formation device; a test chart production control unit that controls the image formation device to produce a test chart; a condition preparing unit preparing a condition for setting tone characteristic based on either one of the tone characteristic data stored in the memory and actual tone characteristic indicated by the test chart produced by the image formation device; and a characteristic setting unit setting tone characteristic based on the condition prepared by the condition preparing unit.

In the tone characteristic data setting device, a tone characteristic production operation may be performed to input data of a plurality of input levels to an image formation device to control the image formation device to produce a plurality of tone patches, to control a tone measurement device to measure tones of the plurality on tone patches and to produce data of a plurality of output, levels indicative of the measured tones of the tone patches, and to produce the tone characteristic data based on relationship between the output levels and the corresponding input levels.

Information including the produced tone characteristic data may be stored in a data file. In this case, the condition preparing unit stores the data file, thus prepared during some tone characteristic production operation, while maintaining a preserved data file that is prepared separately from the data file. When desiring to control the image formation device to form images, the characteristic setting unit may perform a control on the image formation device based on information retrieved from the data file, when necessary, the characteristic setting unit executes control of the image formation device based on other information that is retrieved from the preserved data file.

The preserved data file may include another data file that has been produced by the system during another tone characteristic production operation that is conducted prior to the present tone characteristic production operation and that is maintained in the memory when the tons characteristic is updated into the newly-produced data file during the present tone characteristic production operation.

Alternatively, the preserved data file may include a standard data file that has been produced by the system during a tone characteristic production operation that is conducted before the tons characteristic setting device is shipped from a manufacturer and that is maintained in the memory even when the tone characteristic is updated into the newly-produced data file.

Even when error exists in the newly-produced data file and therefore correct tone characteristic data ay not be obtained from the newly-produced data file, it in unnecessary to again try executing the tone characteristic production operation to produce correct tone characteristic data. When the user desires to perform image formation immediately after starting executing the tone characteristic production operation, the system can stop the present tone characteristic producing operation, but can perform the image formation operation using the reserved data file.

It is likely that a long time has elapsed after the reserved data file has been produced. Accordingly, it is probable that the preserved data file includes data that fails to accurately indicate the present characteristic of the image formation device. However, the preserved data file does not include any data that es error in the image forming operation by the image formation device. Accordingly, the image formation device will perform image forming operation with data in the preserved data file. The system of the present invention is therefore preferable in comparison with such a system that may not perform any image forming operation until correct tone characteristic data is produced.

It is noted that only one data file may be retained when a newly-produced data file is produced. Or, two or more data files may be retained when a newly-produced data file is produced. The maximum number of data files retainable in the memory can be set in the case where two or more data files are retained. It may be possible to optionally select whether or not to retain data file(s) when setting the newly-produced data file in the memory. When a plurality of data files are retained, it may be possible to optionally select one of the data files as a preserved data file for use. For example, one data file that has been produced most recently may be automatically selected as a preserved data file. When needed, the user can designate another data file as a preserved data file.

Each data file may include data indicative of various image forming conditions, such as model type data, ink type data, medium type data, image formation resolution data, and image formation speed data. It is noted that the model type data may indicate all the different models as different models. Or, the model type data may indicate, as the same model, several different models that have the same characteristics. The ink type data indicates the type of coloring material. The medium type data indicates the type of medium. The resolution data indicates the number of dots formed per a unit length, such as one inch. The image formation speed data indicates whether the image forming device is in a normal speed image forming mode or a high speed image forming mode. Each condition data can be prepared as a predetermined code, a predetermined character string, or a predetermined numerical value.

In this case, the condition preparing unit may store a plurality of data files those conditions are partly different from one another. Normally, in order to perform image forming operation with the image forming device, the setting unit selects one data file that matches an image forming condition actually set in the image forming device. Using data retrieved from the selected data file, control is attained onto the image forming device. When required, however, it is possible to select one data file among other data files that do not match the actual condition of the image forming device. In such a case, according to a priority predetermined to the several conditions, the system selects one data file whose characteristic is deemed to be near to the present condition. Using data retrieved from the thus selected data file, control is attained onto the image forming device.

Even if those data files that are prepared for conditions, different from the present condition, have data that fails to accurately indicate the present characteristic of the image forming device, those data files have the same data structure, and therefore can control the image formation device to perform image forming operation.

When a plurality of image formation devices of the same type are included in the system, a data file may be prepared and stored in correspondence with each image formation device. In such a case, when necessary, one image formation device can be controlled using a data file that is not for the subject image formation device but that is for another image formation device, but of the same model. It is noted that a data file prepared for each image formation device shows the characteristic of the image formation device's own. Thus, a data file prepared for one image formation device will probably fail to accurately indicate tons characteristic of another image formation device. However, the difference between characteristics indicated by those data files are considered small because those data files are prepared for the image formation devices of the same model.

The condition preparing unit may prepare a plurality of standard data sets and a plurality of standard tone characteristic data sets.

For example, the condition preparing unit stores a set of test data controlling the image formation device to form a test chart whose color characteristic is to be measured by the tone measurement device. The plurality of standard data sets correspond to a plurality of sets of color measurement data that are to be obtained by the tone measurement device from the test chart if the image formation device is controlled to produce the test chart using the set of test data. The plurality of sets of standard tone characteristic data correspond to the plurality of sets of the standard data.

In this case, the characteristic setting unit outputs, in response to an instruction from an outside, the test data to the image formation device, receives tone measurement data from the colorimeter that measures the test chart, compares the tone measurement data with each set of standard data and specifies one proper set of standard data based on the comparing result, and retrieves one set of standard tone characteristic data that corresponds to the retrieved set of standard data, and stores the retrieved not of standard tone characteristic data as tone characteristic data that is to be used thereafter for converting original image data (original tone data) into image formation data (input tone data) to be supplied to the image formation device.

Thus, no complicated calculation operation is necessary. It takes only a short period of time to set the tone characteristic data.

In order to compare the tone measurement data with the standard data, it is possible to compare color differences between the respective tone measurement data and the corresponding standard data, each color difference being indicated by a color distance in an Lab color space defined according to the Lab colorimetric system (CIE 1976). The device retrieves one set of standard tone characteristic data that corresponds to one set of standard data that has the smallest color difference. The retrieved standard tone characteristic data is set as tone characteristic data.

Instead of comparing the color differences between the tone measurement data and the standard data, it is possible to compare density differences between the tone measurement data and the standard data.

It is noted that the thug simply-selected standard tone characteristic data may possibly deviate from an optimum value that is accurately indicative of the present characteristic of the image formation device. However, by storing the standard data and the standard tone characteristic data as many as possible by considering all possible conditions the user may desire in the image formation device, it is possible to set accurate tone characteristic data even by simply selecting one set of standard tone characteristic data.

It may be possible to store a plurality of sets of test data that correspond to a plurality of types of tone measurement devices. The user can control the device to set tone characteristic data by using his/her own tone measurement device. The user does not need to purchase any new tone measurement device. Increase of costs by the user can be prevented.

It is noted that the tone measurement data obtained by the tone measurement device may include: data indicative of coordinates of positions of the respective patches (or patch numbers) produced by the test data, and data indicative of hue, lightness, and saturation of color reproduced on the color patches. In order to allow the device to compare the standard data with the tone measurement data, the standard data preferably has the same data format an the tone measurement data.

Generally, tone measurement data obtained by the tone measurement device, such as a calorimeter, has numerical values indicative of hue, lightness, and saturation defined in same colorimetric system, such an the XYZ calorimetric system (CIE 1931 calorimetric system) or the Lab colorimetric system (CIE 1976 colorimetric system). Because tone measurement data has such numerical values, the standard data has to be prepared to have numerical values, too.

For example, it in preferable to set standard data in a manner described below.

Test image data is supplied to the image formation device in a plurality of image forming characteristics, thereby allowing the image formation device to form tone images on an image recording medium. The colorimeter in controlled to measure the tone images to obtain a plurality of sets of output levels. A plurality of sets of standard data are set based on the thus, obtained plurality of sets of output levels. Based on the relationship between the test image data and the plural sets of output level data, a corresponding plurality of sets of standard tone characteristic data are further determined.

Using the thus produced standard data sets, it ls possible to easily compare, with the standard date sets, tone measurement data that is obtained when the colorimeter measures the test chart. Additionally, because each standard tone characteristic data set and a corresponding standard data set are produced in association with one another, they may be simply stored together in the device.

Because color values in the XYZ colorimetric system (CIE 1931) are able to be converted into color values in other colorimetric systems such an the Lab colorimetric system (CIE 1976). It is preferable to prepare the standard data as defined in the XYZ colorimetric system. The standard data may be converted into any optional colorimetric system that corresponds to the tone measurement data obtained by the measurement device. It is possible to prevent increase of data storage amounts.

It is sufficient that an average value of the tone measurement values for all the tons patches be calculated and compared with a single value in each standard data set. In this case, it is sufficient that the memory stores only a single average value as each standard data set. Only one comparing operation is needed to compare the measured average value with the standard data. It takes a shorter time than comparing all the patch-measurement data with the corresponding standard data.

Intermediate tone can deviate easily according to even slight changes in the characteristic of the image formation device. Each of the color difference and the density difference, between the measurement data and the standard data, will easily appear in the intermediate tones. It is also possible to prevent occurrence of similar values in the color or density differences, according to the change in the image formation device characteristic. It is possible to easily specify one set of standard data that is appropriate for the characteristic of the image formation device and for the image forming condition employed by the image formation device.

The condition preparing unit may control the image formation device, using observation test data, to produce an observation test chart to be visually observed by a user. In response to the user's observation of the observation test chart, the characteristic setting unit determines to performs operation to set or update the tone characteristic.

For example, when instructed from outside, the condition preparing unit converts the observation test data, according to presently-set tone characteristic data, into image formation data, and outputs the image formation data to the image formation device. The image formation device is controlled to produce several image regions in its single image formation area of the observation test chart by changing image forming material or a composition of the image forming material.

The user can visually observe the color pattern on the observation test chart, and determine whether or not it is necessary to update the presently-set tone characteristic data. The user can therefore perform the tone characteristic data setting operation only when updating is necessary. The user can perform the judgement operation to determine whether or not it is necessary to update the tone characteristic data, simply by inputting his/her instruction to produce the test chart. The user is not urged to perform complicated operations. Work efficiency is not lowered.

The user will judge similarity in color between the several image regions on the test chart. The user will judge whether or not he/she can visually recognize some figure pattern of characters or symbols on the observation test chart. Or, the user will judge similarity in color between the several image regions that are defined to indicate some figure pattern of characters or symbols.

There is an image formation device such as a color printer that forms color images on a recording medium by using four image formation materials, such as black ink, cyan ink, magenta ink, and yellow ink. When mixing the cyan, magenta, and yellow ink or laying the cyan, magenta, and yellow ink one on another, color the same as or similar to black ink can be obtained. In the observation test chart, therefore, the device may produce a black color pattern using black ink only and may produce a mixed color pattern using cyan, magenta, and yellow ink so that both patterns are located next to each other with a boundary therebetween. When the amounts of at least one of the black, cyan, magenta, and yellow ink used in each pattern change, a color difference occurs between the respective image patterns. The color difference can be properly confirmed visually by the user. When the observation test chart has the K-color region and the CMY mixed-color region, especially when these regions are produced to present intermediate tones, the color difference will appear great for even a slight change in the characteristic of the image formation device. Thus, the user can easily and reliably confirm whether or not updating is necessary by the visual observation of the test chart.

An observation test chart may be produced every time the tone characteristic setting device is powered on. Even when image formation is performed immediately after the setting device is powered ON, it is possible to prevent the setting device from causing the image formation device to produce improper colors due to unstable condition of the image formation device.

It is noted that the tone characteristic setting device may preferably be incorporated, into a computer system, together with an image processing portion for converting original tone data into input tone data to be supplied to the image formation device. The computer system is comprised of a personal computer, a monitor, a key board, a mouse, and etc. In this case, the monitor is used to display an indication to urge the user to select a desired calorimeter, and the key-board or the mouse is used to select and input the user's selection. It is possible to successively perform all the processes including: selection of parameters, calculations, output of test image data, input of color measured results, and calculation of tone characteristic data.

The tone characteristic device can be incorporated into an image formation device such an a printer or a display. In this case, the selection unit such an a monitor, a selecting button, and the like has to be incorporated into the image formation device. When the tone characteristic device is incorporated into the image formation device, a test chart can be produced immediately.

The tone characteristic setting device can be constructed as a system for exclusively producing tone characteristic data. However, the system can be constructed from a general-use computer system. In this case, a data recording medium storing a tone characteristic data setting program is provided, and the program is retrieved from the data recording medium and installed into the computer system.

That is, the present invention provides a data recording medium storing a tone characteristic setting program for being read by a computer system to control the computer system to set tone characteristic data of an image formation device, the computer storing data of tone characteristic of the image formation device, the program comprising: a program controlling the image formation device to produce a test chart; a program preparing a condition for setting tone characteristic based on either one of the tone characteristic data stored in the memory and actual tone characteristic indicated by the test chart produced by the image formation device; and a program setting tone characteristic based on the prepared condition.

For example, a data recording medium storing first and second programs described below may be provided, and the program are retrieved from the data recording medium and installed into the computer system. The first program includes a program for controlling a computer to perform a tone characteristic production/storage operation: to input data of a plurality of input levels to an image formation device to control the image formation device to produce a plurality of tone patches: to control a tone measurement device to measure tones of the plurality of tone patches and to produce data of a plurality of output levels indicative of the measured tones of the tone patches; to produce tone characteristic data based on relationship between the output levels and the corresponding input levels; and to store information including the produced tone characteristic data in a data file. The second program includes a program for controlling, when desiring to form images, the computer to perform image formation control operation onto the image formation device based on information retrieved from the data file and to perform image formation control operation onto the image formation device, when necessary, based on other information that is retrieved from a preserved data file that is prepared separately from the data file.

The preserved file may includes a date file relined when the data file is updated into a new date file, a data file prepared before the tone characteristic setting device is shipped from a manufacturer, a data file that is prepared for conditions, a part of which is different from the conditions for the main data file, or a data file prepared for an image formation device of a different type.

Both of the first and second programs are stored in the data recording medium that can be read by the computer system. It is, however, unnecessary that both of the first and second programs be stored in the same data recording medium. It is now assumed that a data recording medium storing the first program and another program has already been supplied to a computer system. In such a case, another data recording medium storing the second program only can be a supplied to the computer system. Because the first program is already supplied to the computer system, it is sufficient to supply the computer system with the data recording medium that stores the second program only.

BRIEF DESCRIPTION OF THE DRAWINGS

The above and other objects, features and advantages of the invention will become more apparent from reading the following description of the preferred embodiments taken in connection with the accompanying drawings in which:

FIG. 2(*b*) is a schematic view showing a data structure of calibration data in the calibration file of FIG. 2(*a*);

FIG. 3(*b*) shows how color patches are arranged in a test chart;

FIG. 3(*c*) is a graph indicative of a relationship between input tone levels Din and output tone levels Dout for each color;

FIG. 6(*b*) shows how color patches are arranged in a test chart printed according to the test chart of FIG. 6(*a*);

FIG. 7(*a*) is a schematic view showing how a plurality of standard data sets are stored in the personal computer of FIG. 5;

FIG. 7(*b*) is a schematic view showing a data structure of each set of standard data shown in FIG. 7(*a*);

FIG. 7(*c*) is a schematic view showing how a plurality of standard calibration data sets are stored in the personal computer of FIG. 5;

FIG. 7(*d*) is a schematic view showing a data structure of each set of standard calibration data shown in FIG. 7(*c*);

FIG. 11(*a*) is a schematic view showing a data structure of each set of standard data according to a modification 1 for the second embodiment;

FIG. 11(*b*) is a schematic view showing a data structure of a set of color measurement data obtained from a colorimeter according to the modification 1 for the second embodiment;

DETAILED DESCRIPTION OF THE PREFERRED EMBODIMENTS

Figure 1:
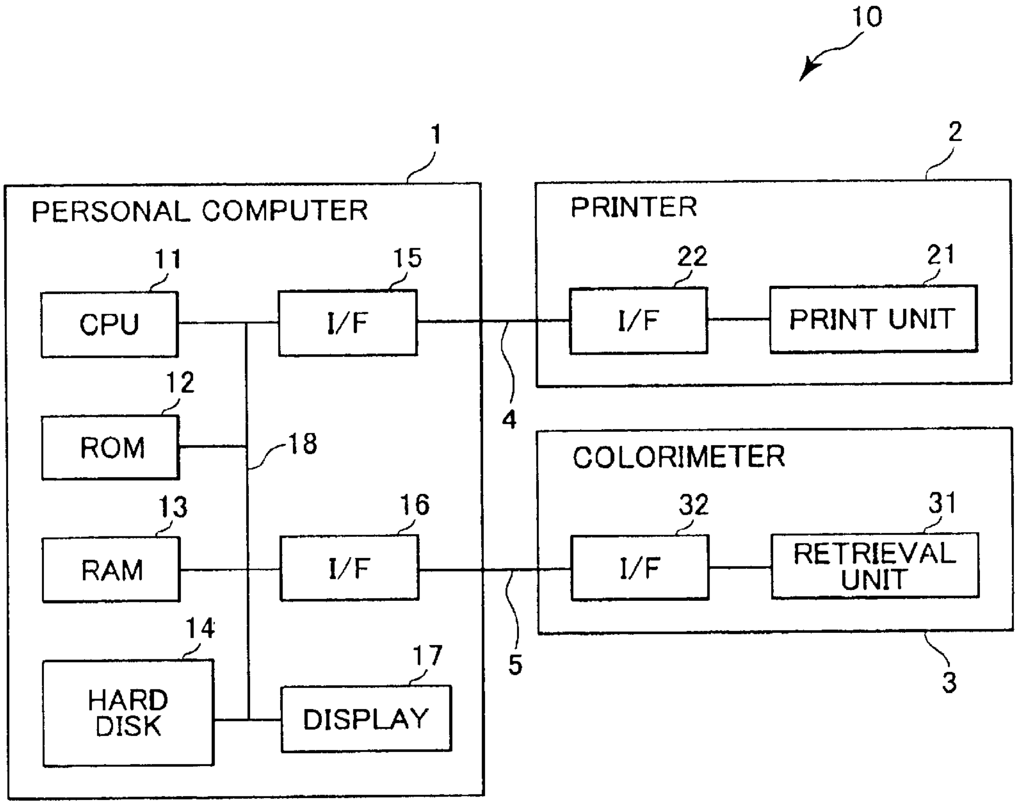
FIG. 1 is a block diagram showing a printing system according to a first embodiment of the present invention.

A tone characteristic setting device according to preferred embodiments of the present invention will be described while referring to the accompanying drawings wherein like parts and components are designated by the same reference numerals to avoid duplicating description.

First, a tone characteristic data setting device according to a first embodiment will be described below.

The first embodiment is provided to enable setting of allowable tone characteristic data even when correct tone characteristic data is not available.

A print system that includes a tone characteristic data setting device according to the present embodiment will be described below with reference to FIGS. 1 through 4.

FIG. 1 shows the printing system 10 that includes a personal computer 1, a printer 2, and a colorimeter 3. The personal computer 1 and the printer 2 are connected by an interface cable 4 for enabling transmission of data between the personal computer 1 and the printer 2. Also, the personal computer 1 and the colorimeter 3 are connected by an interface cable 5 for enabling transmission of data between the personal computer 1 and the colorimeter 3.

The personal computer 1 includes a CPU 11, a ROM 12, is a RAM 13, a hard disk device 14, a printer interface 15, a calorimeter interface 16, and a display 17. All these components are connected together via a bus 18, ad therefore are capable of exchanging data via the bus 18.

The CPU 11 is for controlling various components and performing various calculations according to a variety of programs that are stored in the ROM 12 and according to another variety of programs which are retrieved from the hard disk device 14 and stored in the RAM 13 temporarily. The ROM 12 is a read only memory and stores a variety of programs, such as various application programs, and data that does not need to be re-written. The RAM 13 is a random access memory that can be re-written as desired. In addition to the variety of programs retrieved from the hard disk device 14, the RAM 13 stores data obtained by the variety of calculations performed by the CPU 11. The hard disk device 14 is an auxiliary memory that stores, as files, data and programs that are not constantly stored in the main memories such as the ROM 12 and the RAM 13.

Figure 2A:
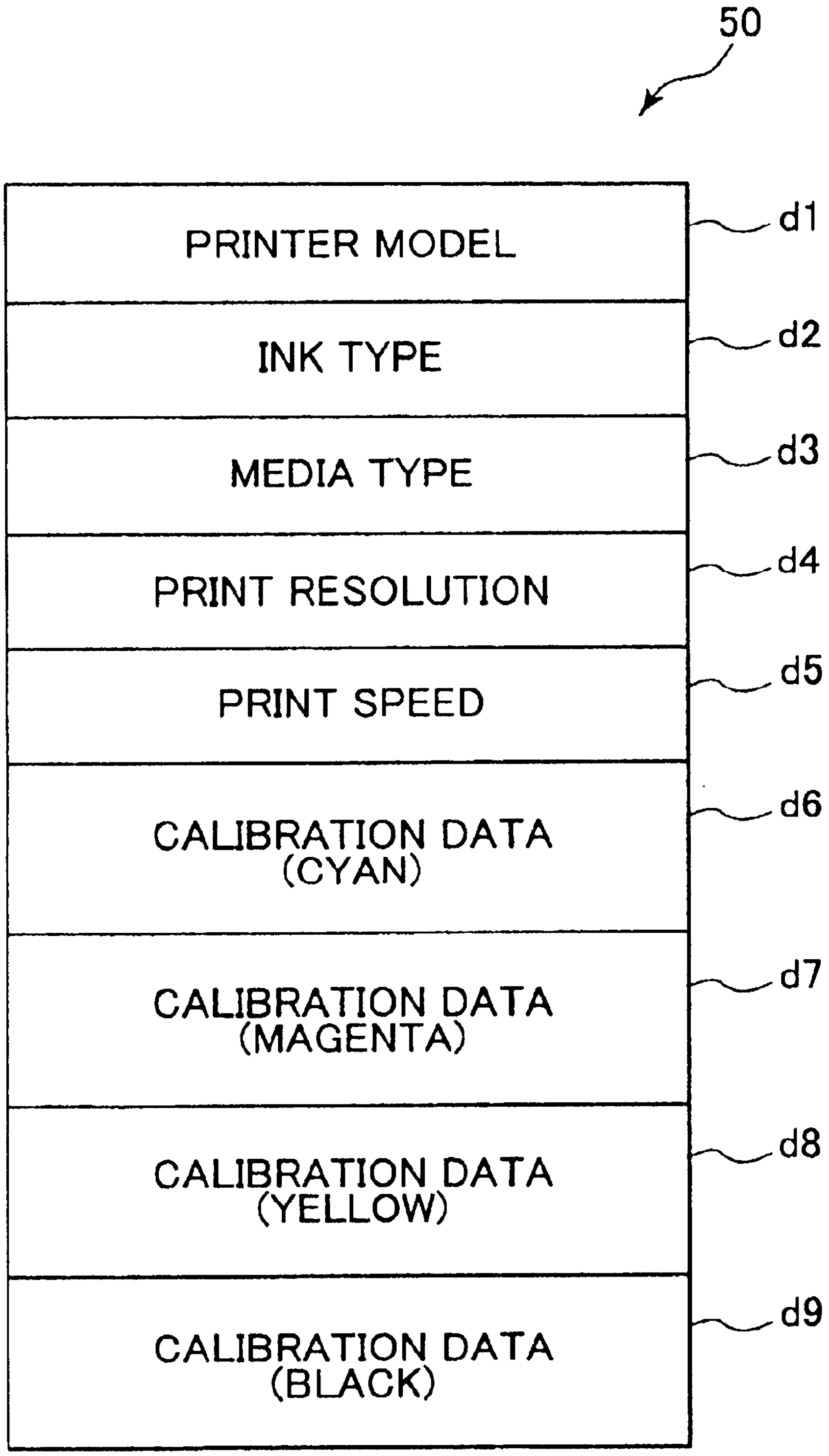
FIG. 2(*a*) is a schematic view showing a data structure in a calibration file.
Figure 3A:
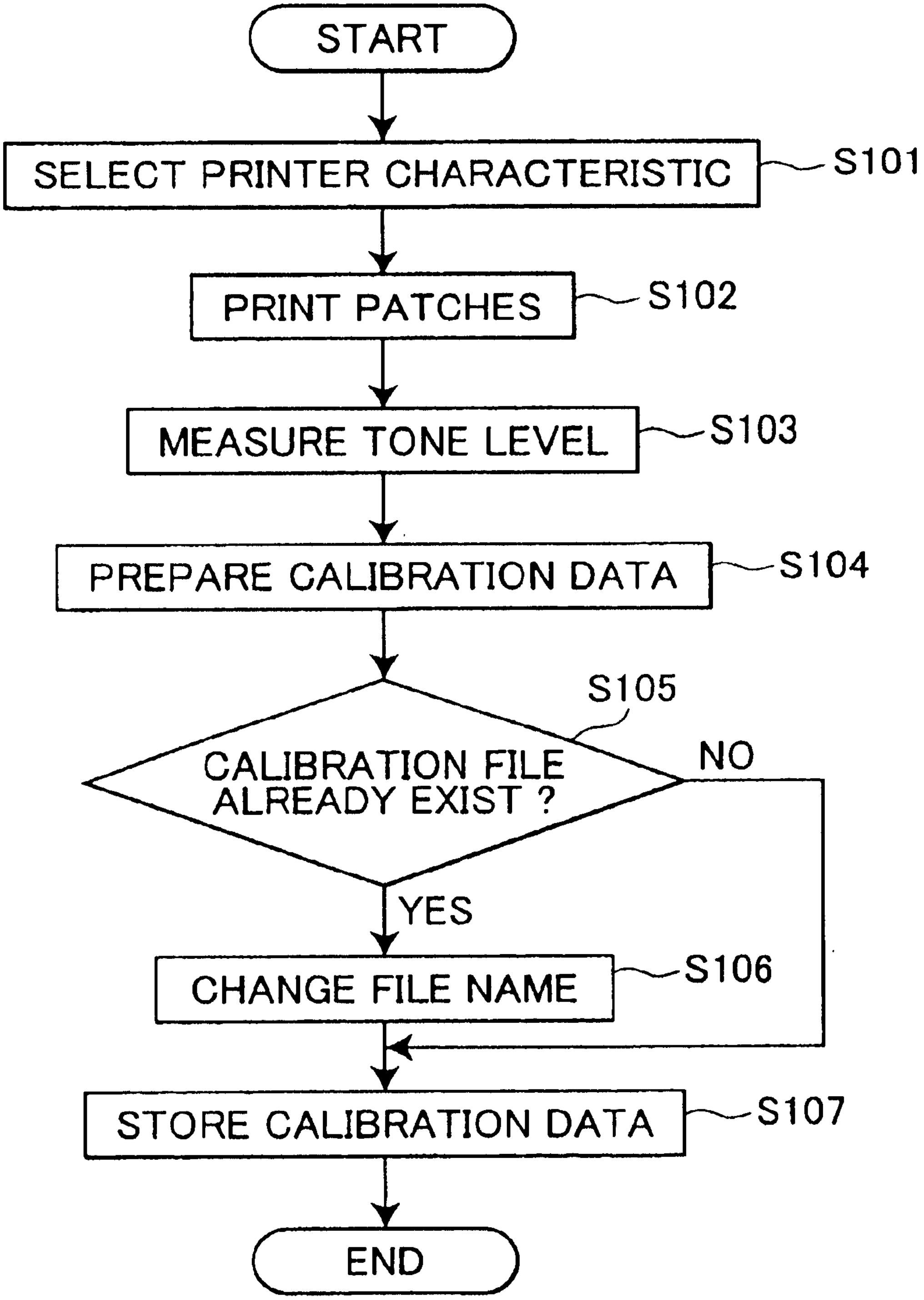
FIG. 3(*a*) is a flowchart representing a calibration file preparation routine according to the first embodiment.
Figure 3B:
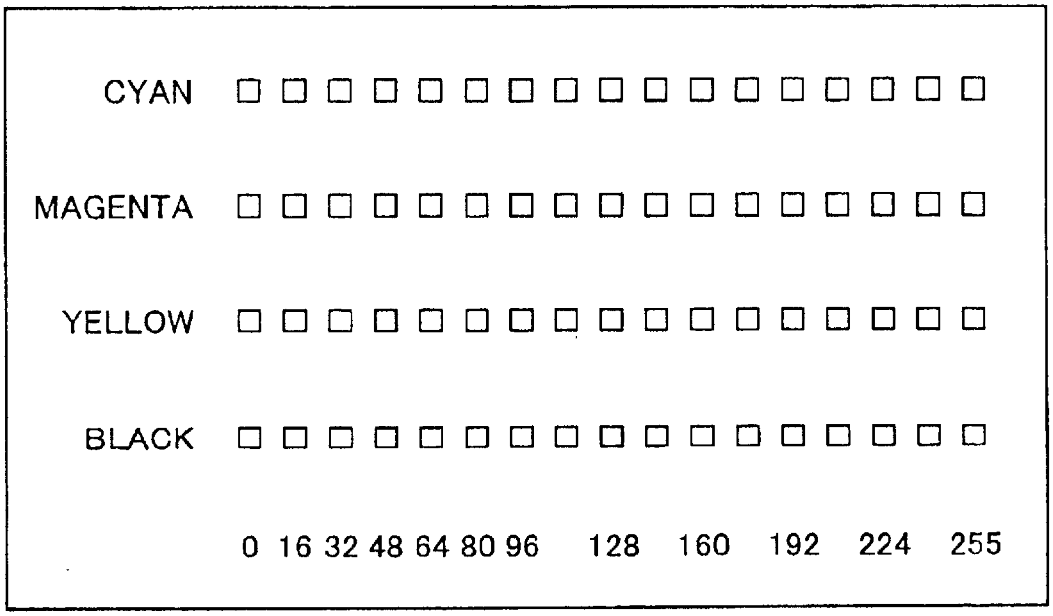
Figure 3C:
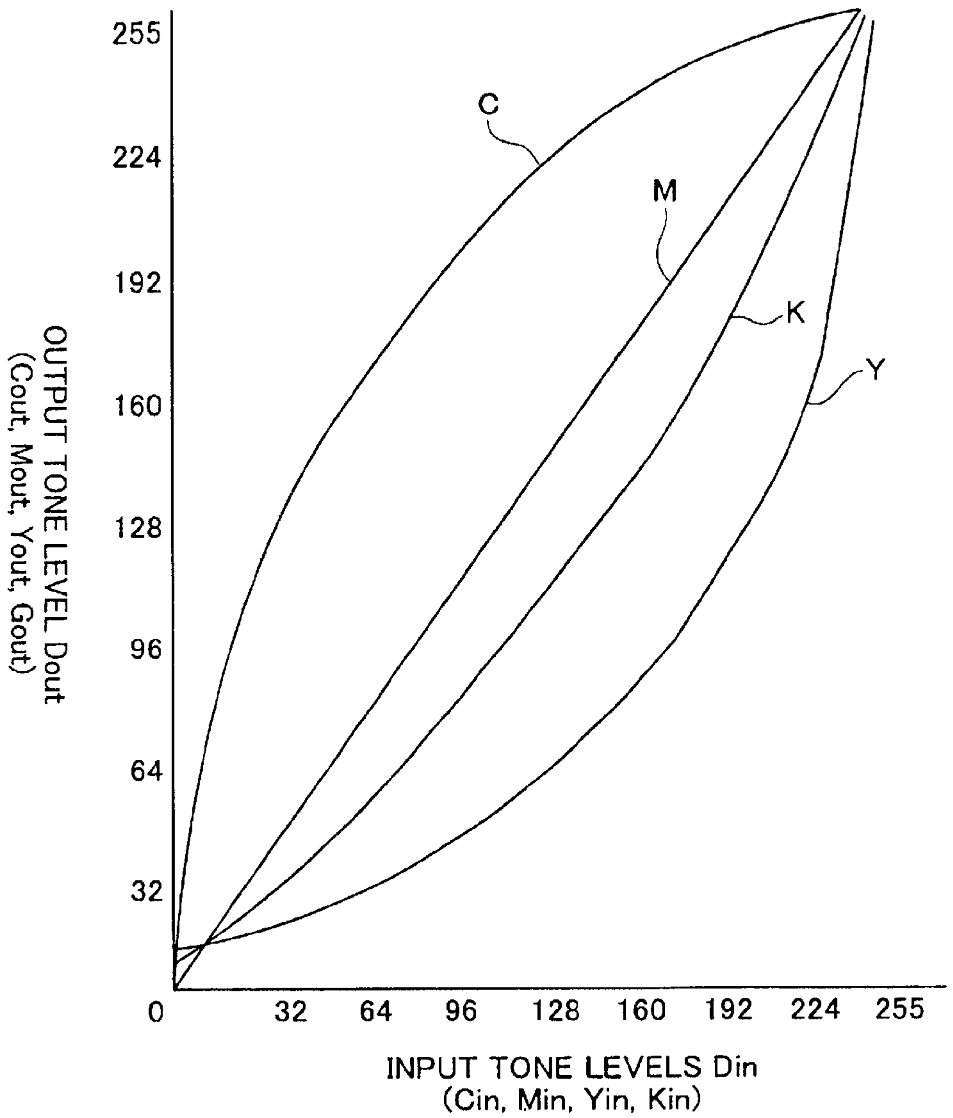

In the present embodiment, the ROM 12 stores therein a variety of programs, such as an image formation program (FIG. 4) and a calibration data preparing program (FIG. 3(*a*)) that are to be executed by the CPU 11. When executing the image formation program of FIG. 4, the CPU 11 receives original tone level data (original pixel data) $D_{original}$ (where D=C, M, Y, K) from an upper rank program such as some application program. The CPU 11 then converts the original tone level data $D_{original}$ (where D=C, M, Y, K) into input tone level data (print pixel data) Din (where D=C, M, Y, K). The CPU 11 performs this conversion in accordance with commands inputted from an external source and based on calibration data (FIG. 2(*b*)) which is stored in a calibration data file 50 in the HDD 14. The CPU 11 supplies the input level data Din (where D=C, M, Y, K) to the printer 2, whereupon the printer 2 prints images on a desired recording sheet.

The CPU 11 executes the calibration data preparing program (FIG. 3(*a*)) to produce a calibration file 50 to be stored in the HDD 14. In the calibration data preparing process (FIG. 3(*a*)), the CPU 11 first controls the printer 2 to print a test chart. The CPU 11 first controls the printer 2 to print a test chart. The CPU 11 then controls the colorimeter 3 to measure colors of the printed test chart. Based on color measurement data received from the colorimeter 3, the CPU 11 calculates a calibration file 50.

The printer interface 15 performs data transmission in both directions between the printer 2 and the personal computer 1 according to a special transmission protocol agreed upon by the personal computer 1 and the printer 2. Similarly, the colorimeter interface 16 transmits data both ways between the personal computer 1 and the colorimeter 3 according to another special transmission protocol agreed upon the personal computer 1 and the colorimeter 3. The display 17 displays a variety of data in a manner that can be visually recognized by the user of the present system.

The printer 2 includes an ink jet printing unit 21 and a personal computer interface unit 22. The ink jet printing unit 21 executes color printing based on print data Din (where D=C, M, Y, K), inputted from the personal computer 1, using four different colors of ink, that is, cyan, magenta, yellow, and black. The ink jet printing unit 21 can execute multi-level tone printing having 256 tone levels for each color. The PC interface 22 transmits data between the printer 2 and the printer interface 15.

The colorimeter 3 includes a retrieval unit 31 and a PC interface 32. The retrieval unit 31 measures intensity of light transmitted through or reflected from an object being measured. The retrieval unit 31 divides the colors of the subject of measurement into four primary colors (cyan (M), magenta (M), yellow (Y), and black (K)), and outputs tee tone of each primary color as color measurement data Dout (where D=C, K, Y. K). In the following explanation, the act of actually measuring tone in the subject or investigation and obtaining color measurement data will be referred to as measuring tone level or measuring color. The PC interface 32 is for transmitting data between the colorimeter 3 and the colorimeter interface 16.

It is noted that a calibration data file 50 is prepared in the hard disk device 14 when the calibration file preparation routine (FIG. 3(*a*)) is executed. As shown in FIG. 2(*a*), a variety of information, such as printer model region d1, ink type region d2, media type region d3, print resolution region d4, print speed region d5, and four sets of calibration data regions d6 to d9 are stored in the calibration data file 50.

The printer model region d1 stores a code that is different for each different recording method, such as ink jet printing and laser printing. The ink type region d2 stores a code representing a type of coloring agent, such as pigment ink, dye ink, or toner. The media type region d3 stores a code representing a type of median used for printing, such as normal paper, a glossy paper, or resin film. The print resolution region d4 stores numerical data representing the number of dots to be printed per inch. The print speed region d5 stores a code representing printing speed, such as normal speed printing or high speed printing.

The calibration data regions d6 to d9 correspond to the respective colors (cyan, magenta, yellow, and black). Each calibration data region d6–d9 stores one set of calibration data for a corresponding color. Each set of calibration data includes 256 sets of numerical data. The total 256 sets of numerical data respectively indicate input levels Din (where D=C, M, Y, K) which should be inputted to the printer 2 in order to allow the printer 2 to actually print tones that match original tone levels $D_{original}$ (where D=C, M, Y, K) of 0–255 that can be received from an upper rank program.

In each set of calibration data, as shown in FIG. 2(*b*), the 256 numerical values Din (where D=C, M, Y, K) are located at positions from a 0-th location to a 255-th location in association with corresponding original tone levels $D_{original}$ (where D=C, M, Y, K) of 0 to 255. The calibration data indicates that each tone level $D_{original}$ will be reproduced when a corresponding value Din is supplied to the printer 2.

Figure 4:
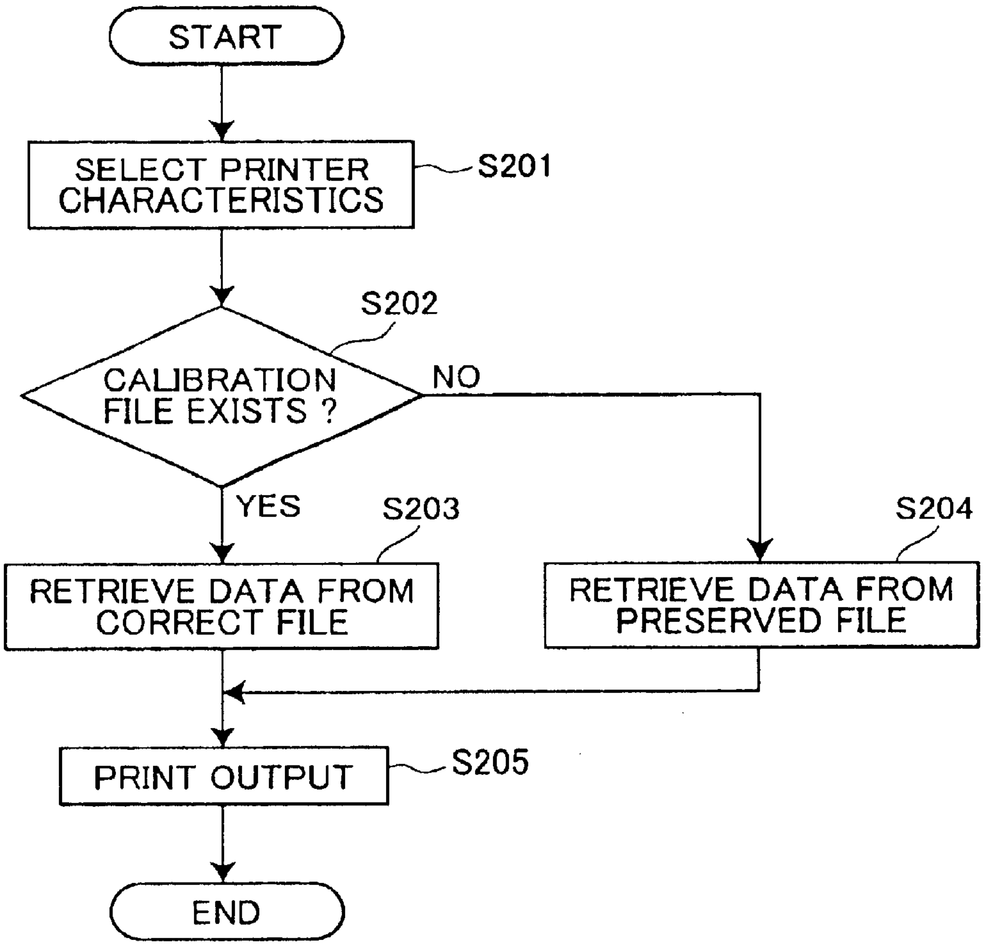
FIG. 4 is a flowchart representing a printing routine.

During the image formation process of FIG. 4, when the CPU 11 receives, from some upper rank program, an original tone level $C_{original}$ of "200," for example, the CPU 11 retrieves one numerical data Cin from the 200-th location in the calibration data region d6, and supplies the retrieved data Cin to the printer 2. As a result, the printer 2 will print a tone that actually has a tone level substantially the same as the original tone level $C_{original}$ of "200" if it is measured.

With the above-described structure, the printer system 10 prepares the calibration data 50 by executing the calibration file preparation process shown in FIG. 3(*a*).

The calibration file preparation process is performed when the CPU 11 executes the calibration file preparation program stored in the ROM 12.

When the calibration file preparation process is started, first in S101, the CPU 11 performs operations to enable the user to select printer characteristics. At this time, the CPU 11 controls the display 17 to display categories relating to printer characteristics. In the present embodiment, the display 17 displays five categories, in total, of printer type, ink type, media type, print resolution, and print speed. Each category includes a plurality of preset selections so that the user can select a single optional selection from the plurality of selections.

Next, in S102, the printer 2 is controlled to produce a test chart by printing a plurality of color patches which are needed for measuring tone levels. More specifically, the CPU 11 first prepares input level data or print data Din (where D=C, M, Y, K) for the test image and transfers the input level data to the printer 2. In this example, the CPU 11 prepares input level data for printing 17 color patches with cyan tone levels Cin of 0, 16, 32, 48, 64, 80, 96, 112, 128, 144, 160, 176, 192, 208, 224, 240, 255, 17 color patches with magenta tone levels Min of 0, 16, 32, 48, 64, 80, 96, 112, 128, 144, 160, 176, 192, 208, 224, 240, 255, 17 color patches with yellow tone levels Yin of 0, 16, 32, 49, 64, 80, 96, 112, 128, 144, 160, 176, 192, 208, 224, 240, 255, and 17 color patches with black tone levels Kin of 0, 16, 32, 48, 64, 80, 96, 112, 128, 144, 160, 176, 192, 208, 224, 240, 255.

Receiving the print data, the printer 2 produces a test chart by printing a plurality of color patches as shown in FIG. 3(*b*). In the test image, four rows of patches are printed, one row corresponding to each different color ink, cyan, magenta, yellow, and black. Each row includes seventeen patches with different tones Din (where D=C, M, Y, K) of corresponding color, that is, 0, 16, 32, 48, 64, 80, 96, 112, 128, 144, 160, 176, 192, 208, 224, 240, 255. Thus, in each row, adjacent patches are separated by about 16 levels of tone. Each patch is a square pattern having a sufficient surface area to enable the colorimeter 3 to measure the tone level of each patch.

In S103, the colorimeter 3 is used to measure a tone level of each patch printed in S102. The order in which patches are measured is predetermined so that first all cyan patches, then all magenta patches, then all yellow patches, and finally all black patches are measured in this order. The patches in each color are measured from the lowest tone level "0" up to the highest tone level "255". Thus, the colorimeter 3 successively produces color measurement data (output tons levels) Dout (where D=C, K, Y, K) indicative of the measured tone levels, and successively transmits the color measurement data Dout in the same order to the computer 1.

In S104, the CPU 11 prepares calibration data for each color.

That is, when the CPU 11 receives output tone levels Dout for all the 68 patches, the CPU 11 first performs, for each color, interpolation between the seventeen output levels Dout to determine all the tone levels that should be obtained by the printer 2 in response to all the 256 input levels Din (where D=C, M, Y, K) of "0" to "255". More specifically, because output levels Dout are obtained only for input levels Din of 0, 16, 32, 48, 64, 80, 96, 112, 128, 144, 160, 176, 192, 208, 224, 240, 255, output levels Dout for other input levels 1–15, 17–31, 33–47, 49–63, 65–79, 81–95, 97–111, 113–127, 129–143, 145–159, 161–175, 177–191, 193–207, 209–223, 225–239, and 241–254 are estimated by interpolating between the obtained output levels Dout. Once output levels Dout have been completely obtained in correspondence with all the input levels Din (where D=C, M, Y, K) of 0–255 for each color, the relationship between all the input levels Din, applied to the printer 2, and the corresponding output tone levels Dout, reproduced by the printer 2, are obtained as shown in the graph of FIG. 3(*c*).

Based on the thus determined Din-Dout relationship, the CPU 11 further calculates, for each color, which input level Din (where D=C, M, Y, K) should be applied to the printer 2 in order to reproduce each of the 256 output tone levels Dout of 0–255. As a result, 256 input levels Din (where D=C, M, Y, K) are determined, for each color, as a value that is capable of controlling the printer 2 to reproduce the respective tone levels Dout of 0–255.

Then, under the assumption that a tone level Dout obtained by the printer 2 has a linear relationship with an original tone level $D_{original}$ (where D=C, M, Y, K) to be supplied from any upper rank program, the CPU 11 arranges the 256 numerical values Din that should be applied to the printer 2 to reproduce the tones Dout of 0–256, in correspondence with 256 original numerical values $D_{original}$ of 0–255 as shown in FIG. 2(*b*). Thus, four gets of calibration data are prepared respectively for the four colors (cyan, magenta, yellow, and black).

It should be noted that the method of determining data by interpolating between the 17 output levels Dout are optional. For example, linear interpolation can be used to determine an output value Dout between two adjacent points using output levels Dout at the two adjacent points. Or, interpolation may be performed using a curve of the second order. In this case, an approximate expression that appears the most appropriate can be determined using the least square method by using additional points other than the adjacent points.

Once the calibration data has been completely prepared, then the program proceeds from S104 to S105 (FIG. 3(*a*)).

In S105, it is checked whether or not a calibration file 50 already exists in the HDD 14 for the some printer characteristic. If some calibration file already exists in the HDD 14

(S105:YES), then in S106, the file name of the already-existing calibration file is changed to a different file name in order to retain this already-existing calibration file. At this time, separate file name can be automatically set according to a prescribed rule or can be optionally set by the user.

In S107, the four sets of calibration data prepared during processes in S104 and the printer characteristic selected in the processes in S101 are stored together as a new calibration file 50 as shown in FIG. 2(*a*). At this time, the file name of the now calibration file can be automatically set according to the prescribed rule or can be set optionally by the user.

Next, printing processes, which are executed by the CPU 11 according to a printing program stored in the ROM 12, will be explained while referring to FIG. 4. When the printing process is started, in S201 the CPU 11 urges the operator to select a printer characteristic that the operator wishes to use. In other words, in S201, the CPU 11 displays five categories, relating to printer characteristics, on the display 17. The five categories are printer type, ink type, media type, print resolution, and print speed. Several options are prepared beforehand for each category. The operator selects a single desired option from the plurality of options for each category.

In S202, the CPU 11 checks whether or not there exists, the HDD 14, a usable, correct calibration file 50 that properly matches the printing characteristics selected in S201. It is noted that the actual method used to check in S202 can be optionally selected. In this example, information relating to printing characteristic is stored within each calibration file 50, at its data regions d1–d5, as shown in FIG. 2(*a*). Accordingly, in S202, the CPU 11 may open up the calibration files 50 in a suitable order, such as by an order of file name or by order of the last updated date, and retrieve the printer characteristic from each file. Once the CPU 11 discovers the file that matches the printer characteristic selected by the processes in S201, then in S202 the CPU 11 can determine that a usable, correct calibration file exists (S202:YES).

It is noted that as an alternative method, information relating to a printer characteristic, that is, data in regions d1–d5 can be extracted beforehand from all the existing calibration files 50 to prepare a list that shows a printer characteristic in correspondence with each file name. If such a list file exits, then by merely opening up this list file, the CPU 11 can determine in S202 whether or not any usable, correct calibration file exists.

As a further alternative method, a unique file name that represents the printer characteristic in the data regions d1–d6 can be appended to each calibration file. With this configuration, by merely checking the file name in S202, the CPU 11 can determine whether any usable, correct calibration file exists or not.

In S202, if it is determined that a usable correct calibration file exists (S202:YES), then in S203 calibration data is retrieved from the correct calibration file. On the other hand, when no correct calibration file exists (S202:NO), then in S204, calibration data is retrieved from a reserved file.

Examples of the reserved file include: 1) calibration files retained at the time a now calibration file is updated, that is, the files retained in the process of S106, 2) a calibration file (standard calibration file) provided in the printing system 10 when the printing system is shipped from the factory, 3) a calibration file that does not match, only in one single condition, with the user's selected five conditions of printer type, ink type, media type, print resolution, or print speed, or 4) calibration file prepared for a different printer than the printer 2, but for a printer of the same model with the printer 2.

These calibration files 1) to 4) may possibly store calibration data that does not strictly match the present tone characteristic of the printer 2. However, these calibration files do not include data that makes printing impossible. Therefore, when no usable correct calibration file exists, then using such reserved file instead of a correct calibration file, a situation wherein printing cannot be performed can be avoided.

The printing system 10 can store any single one or two or more of the above-described reserved files 1) to 4). If two or more reserved files are used, then configuration should be provided that allows the user to select which reserved file is to be used. Alternatively, the reserved files could be set in a order of priority, for example, 1, 2, 3, 4, can be appended to the reserved files and the reserved files are automatically used starting from the highest priority in the priority order.

In some cases, a plurality of reserved files that are categorized as the same type can exist in each reserved file type of 1) to 4). In this case, which reserved file is used can be optionally designated among the plurality of reserved files that are categorized as the same type. Alternatively, a suitable order of priority can be set to the reserved files that are categorized as the same type and the reserved file with the highest priority in the order of priority can be automatically used.

As an example of the order of priority, for example, in the case of reserved file type 1), by setting the order of priority so that the data files with the most recent preparation date have a highest priority, then it is highly probable that calibration data near the present condition of the printer will be obtained. Also, with the reserved file type 3), first files with only a different speed are searched for and if no such files are found, then files with only a different print resolution are searched for. In this way, files with only different media type, ink type, and printer model type are searched in this order until such a file is found. By setting order of priority to how these reserved files are searched for in this manner, then there is a high probability that calibration data quite close to the present condition of the printer can be obtained.

Once calibration data is retrieved during processes of either S203 or S204, then in S205 original tone levels $D_{original}$ (where D=C, M, Y, K) included in image data, received from an upper rank program, are converted into input tone levels (print data) Din (where D=C, M, Y, K), is to be applied to the printer 2, based on the calibration data. Then, the converted print data Din is provided to the printer 2, which executes printing operations accordingly. The printer 2 will print images whose tone levels Dout (where D=C, M, Y, K) properly match the desired original levels $D_{original}$ (where D=C, M, Y, K).

It should be noted that in the above description, it is assumed that at least one reserved file that can be used as a usable calibration file exists. This is because the reserved file type 2) always exists. For this reason, no particular explanation is provided for the case when absolutely no reserved file exists. However, if possibility exists that no reserved file exists at all, then this is handled by the CPU 11 as an exceptional case and so the CPU 11 performs appropriate error processes, such as displaying an error message on the display 17 and terminates printing operations.

As described above, according to the present embodiment, the operator selects printer characteristics in S201. When a correct calibration file exists (S202:YES), then in S203 calibration data is retrieved from the correct file. When no correct calibration file exists (S202:NO), then in S204 calibration data is retrieved from the reserved file. The reserved file can be a calibration file that is retained when a calibration file is updated or can be a calibration file that is originally provided within the printing system 10 when the printing system is shipped from the factory. When calibration data in retrieved from a correct file or a reserved file, then in S205 original tone levels $D_{original}$, included in image data from some upper rank program, are converted into input tone levels Din, to be applied to the printer, which executes printing accordingly.

Thus, according to the printing system of the present embodiment, if no correct calibration file exists, then calibration data is retrieved from the reserved file. Therefore, printing with allowable quality that does not require strict tone characteristic can be executed. Accordingly, printing is still possible. This makes the printing system easy to handle by the user.

In the above description, the printing system is configured to retrieve calibration data from a reserved file when no correct calibration file exists. However, just because the correct calibration file exists does not mean that correct calibration data can be retrieved. In a cage that correct calibration data cannot be retrieved, calibration data can be retrieved from the reserved file.

Whether or not correct calibration data is retrieved can be determined by checking whether or not each set of retrieved numeric data is within an allowable numerical range, or by using error detecting data. Any optional methods can be used for this determination. Also, if it is difficult to automatically determine whether or not correct calibration data is retrieved, then the user can optionally designate whether or not the reserved file should be used regardless of whether correct calibration data exists or not.

It is noted that the printing system of the first embodiment uses a color printer as the printer 2. However, the printer 2 can be a monochrome printer capable of printing in multi-level tones. In this case, in order to adjust or calibrate a tone level of a single color, calibration data is prepared in the same manner as described above for the corresponding single color and to stored in a single calibration data file. The calibration data can be used while printing the corresponding color.

The printing system of the prevent embodiment prepares a plurality of sets of calibration data only in the number equivalent to the number of different ink colors. However, the same type of calibration data can be prepared for color mixture obtained by combining two or more of these ink colors.

It is noted that in the printing system according to the present embodiment, both the printer 2 and the colorimeter 3 are connected to the single personal computer 1. However, a separate personal computer can be connected to each of the printer 2 and the colorimeter 3 to make a color patch preparation system which includes the printer and its personal computer and a calibration data preparation system which includes the colorimeter and its personal computer. A printing system can also be prepared to have these two systems as subsidiary systems. In such a system, the color patch preparation system performs printing operation. Therefore, in this case, the calibration data file prepared in the calibration data preparation system has to be accessible by the color patch preparation system. Such access can be realized by connecting the subsidiary systems together by a transmission mechanism such as a local area network (LAN). Or, the calibration data file can be stored in a portable recording medium, such as a floppy disk, at the calibration data preparation system side. This calibration data file is read by color patch preparation system so that the color patch preparation system can perform printing operation as needed. In this case, there is no need to provide a configuration to enable data transmission directed between two subsidiary systems.

Also, when a network that is configured from several subsidiary systems connected by a transmission mechanism includes a plurality of personal computers, a plurality of printers, or a plurality of colorimeters, each of the color patch preparation system and the calibration data preparation system can be configured by an optional combination of one of the personal computers, one of the printers, and one of the colorimeters.

In the printing system of the present embodiment, the printer 2 is an ink jet printer. However, other printers besides ink jet printers can be used. Any recording method that is capable of performing multi-level tone printing can be used. With any other types of printer, the tone characteristic data can be prepared by the calibration file preparation processes of the embodiments, stored in a calibration data file, and used during printing.

It should be noted that in the printing system of the present embodiment, the personal computer 1 stores the calibration file preparation program and the printing process program in its ROM 12. However, these types of programs con be stared in the hard disk device 14 and retrieved into the RAM 13 when needed to execute these processes.

A tone characteristic data setting device according to a second embodiment of the present invention will be described below with reference to FIGS. 5 through 11(*b*).

The second embodiment is provided to enable setting of calibration data easily.

Figure 5:
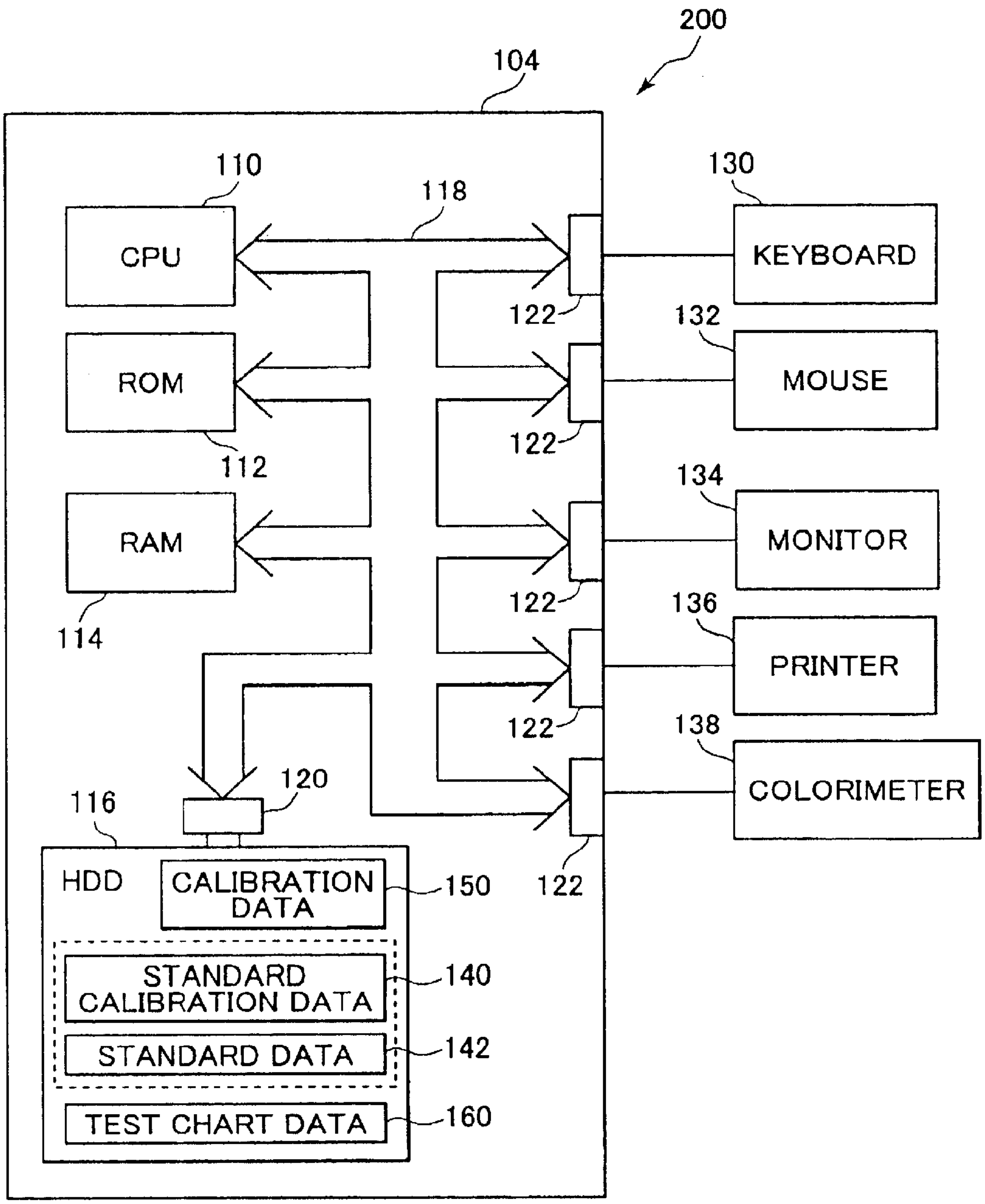
FIG. 5 is a block diagram showing essential components of a personal computer according to a second embodiment of the present invention.

FIG. 5 is a block diagram showing essential components of a personal computer 200 that serves as the tone characteristic data setting device of the present embodiment.

The personal computer 200 includes a computer portion 104 which houses therein a CPU 110, a ROM 112, a RAM 114, and a hard disk drive (HDD) 116. The HDD 116 is connected to the CPU 110, the ROM 112, and the RAM 114 via an interface 120 and a bus 11B. A keyboard 130, a mouse 132, a monitor 134, a printer 136, and a colorimeter 138 are connected to the bus 118 of the computer body 104 each by a separate interface 122. The ROM 112 stores a variety of programs such as various application programs.

According to the present embodiment, the printer 136 is of a type that executes color printing based on print data Din (where D=R, G, B), inputted from the personal computer 200. The printer 136 can execute multi-level tone printing having 256 tone levels for each color (R, G, B). The calorimeter 138 is of a type that measures intensity of light transmitted through or reflected from an object being measured, and outputs a color value (L, a, b) defined in the Lab colorimetric space (CIE 1976 colorimetric system) as color measurement data.

The HDD 116 stores calibration data 150 for present printing conditions as will be described later. The hard disk drive 116 further stores a plurality of sets of standard data 142, a plurality of sets of standard calibration data 140, and one set of test chart data 160.

The HDD 116 further stores therein a variety of programs, such as an image formation program (FIG. 10) and a calibration data setting program (FIG. 8), to be described later, that are executed by the CPU 110.

Figures 9, 10:
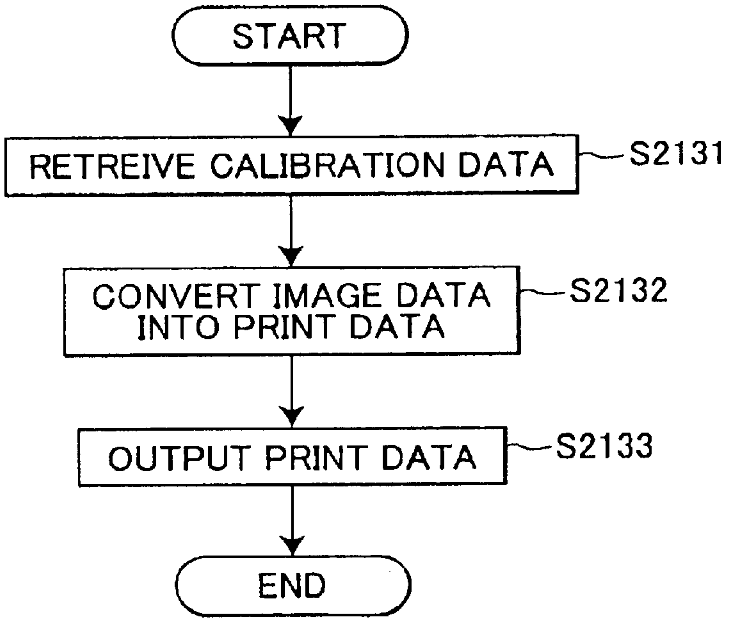
FIG. 9 is a schematic view showing a data structure of a set of color measurement data obtained from a colorimeter during the calibration data setting routine of FIG. 8.
FIG. 10 is a flowchart representing a printing routine according to the second embodiment.

When executing the image formation program of FIG. 10, the CPU 110 receives original tone level data (original pixel data) $D_{original}$ (where D=R, G, B) from an upper rank program such as some application program. The CPU 110 then converts the original tone level data $D_{original}$ (where D=R, G, B) into input tone level data (print pixel data) Din (where D=R, G, B). The CPU 110 performs this conversion in accordance with commands inputted from an external source and based on calibration data 150 which is stored in the HDD 116. The CPU 110 supplies the input level data Din (where D=R, G, B) to the printer 136, whereupon the printer 136 prints images on a desired recording sheet.

The CPU 110 executes the calibration data setting program to update the calibration data 150 stored in the HDD 116. In the calibration date setting process, the CPU 110 first controls the printer 136 to print a test chart using the test chart data 160. The CPU 110 controls the colorimeter 138 to measure colors of the printed test chart.

The CPU 110 then receives color measurement data from the colorimeter 138, and uses the retrieved color measurement data to select one set of standard calibration data 140, thereby updating the calibration data 150 into the selected standard calibration data 140.

Figure 6B:
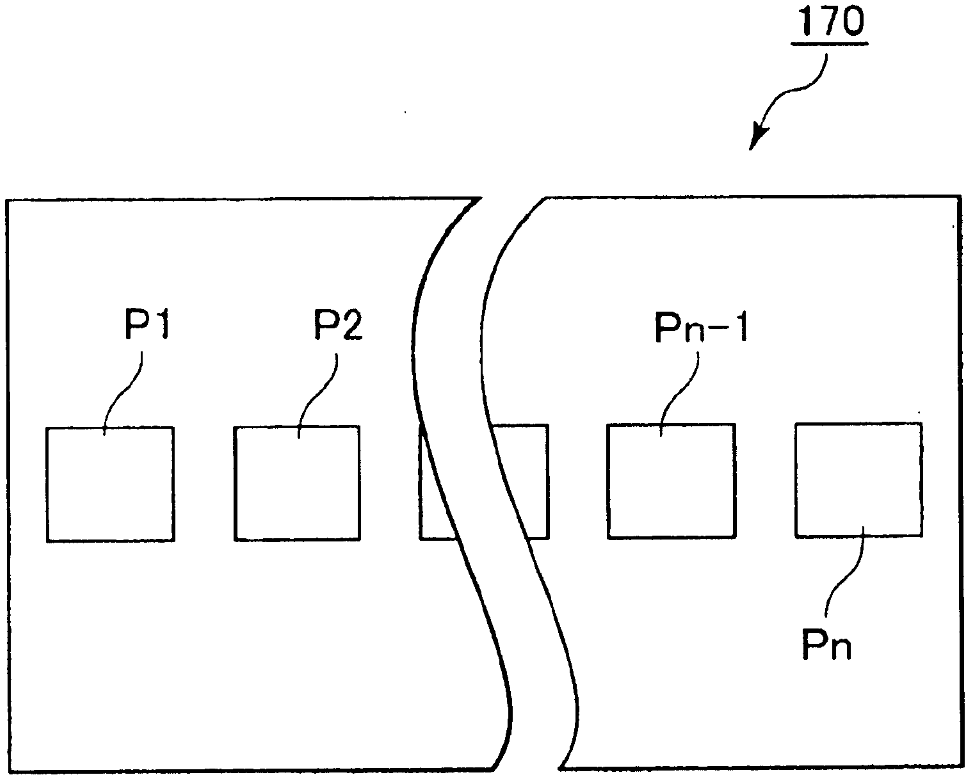
FIG. 6(*a*) is a schematic view showing a data structure of test chart date which is stored in the personal computer of FIG. 5.

As shown in FIG. 6(*a*), the test chart data 160 includes "n" sets of numerical values Din (D=R, G, B) that should be applied to the printer 136 to print "n" number of color patches, in total. In this example, "n" equals 768, and the test chart data 160 includes "n/3=256" sets of numerical values Din (D=R, G, B) of 0–255, for each color R, G, or B, that should be applied to the printer 136 to print "n/3=256" number of color patches for each color.

The test data 160 further includes, in correspondence with several types of colorimeters 138, several sets of coordinate data (x, y), each data set being indicative of positions where the "n" number of patches should be printed on the test chart 170. During the calibration setting routine of FIG. 8, therefore, the user will use the test data 160 with one set of coordinate data (x, y) that corresponds to the user's own colorimeter 138 to be used. Thus, the user can control the device 200 to set calibration data by using his/her own colorimeter. The user does not need to purchase any new colorimeter. Increase of costs by the user can be prevented.

FIG. 6(*b*) shows a test chart 170 printed by the printer 136 when the test chart data 160 with one set of coordinate data (FIG. 6(*a*)) is applied to the printer 136 from the personal computer 104. The test chart 170 includes a line of patch numbers P1 to Pn (where n=768). Each patch has a square shape of, for example, 2 mm×2 mm. Adjacent patches are separated by a fixed distance of, for example, 1 mm. In this example, because n=768, then a total of 768 patches, that is, 256 tone color patches for each of red, green, and blue, are printed on the test chart.

The positions of the respective patches correspond to the coordinate data (x, y) in the used test chart data 160. Accordingly, the patches are aligned in the test chart 170 in the same direction as the direction in which the test chart 170 is fed in the colorimeter 138 so that the calorimeter 138 can read the patches starting from the patch P1 in order up to Pn (where n=768) when measuring the color of the patches.

FIG. 7(*a*) schematically shows a configuration of the plurality of sets of standard data 142, and FIG. 7(*b*) schematically shows a configuration of one get of standard data 142 among the plurality of sets of standard data 142. The plurality of sets of standard data 142 are to be compared with the test chart 170 during the calibration data setting routine of FIG. 8. Each set of standard data 142 corresponds to one of a plurality of image forming conditions to be possibly set in the printer 136 and to one of the several types of colorimeters 138 possibly to be used. As shown in FIG. 7(*b*), each set of standard data 142 includes n (where n=768, in this example) sets of data, one set for each patch number P1 to Pn of the test chart 170. Each set of data includes: a value set (L*', a', b*') numerically indicating a color defined in the L*a*b* color system (CIE 1976) for the corresponding patch numbers and a coordinate value (x, y) for the corresponding patch number.

FIG. 7(*c*) schematically shows a configuration of the plurality of sets of standard calibration data 140. The plurality of sets of standard calibration data 140 are appended with respective reference numbers. FIG. 7(*d*) schematically shows a configuration of one set of standard calibration data 140 among the plurality of sets of standard calibration data 140. It is noted that the plurality of standard calibration data 140 correspond to the plurality of possible image forming conditions to be set in the printer 136. Each set of standard calibration data 140 therefore corresponds to several standard data sets 142 that correspond to the same image forming condition but that correspond to the several types of colorimeter 138, respectively.

As shown in FIG. 7(*a*), each set of standard data 142 further includes a reference number that indicates a corresponding set of standard calibration data 140. Accordingly, several standard data sets 142, which correspond to the same image forming condition, but to the several types of colorimeter 138, include the same reference number indicating the corresponding, single standard calibration date set 140. As will be described later, the reference number is used to retrieve, from the hard disk drive 116, one set of standard calibration data 140 that corresponds to one set of standard data 142.

Each set of standard calibration data 140 is to be used when converting original image data $D_{original}$ (D=R, G, B), from an upper rank program, into image formation data Din (D=R, G, B) so that the printer 136 in a corresponding printing condition can form, on a recording medium, an image in a color with the same hue, lightness, and saturation as originally desired in the original image data $D_{original}$.

Each standard calibration data set 140 corresponds to one of the plurality of possible image printing conditions of the printer 136, and indicates the relationship between the original tone levels $D_{original}$ (wherein D=R, G, B) and the input tone levels Din (where D=R, G, B). Each sat of standard calibration data 140 therefore has a data structure in as shown in FIG. 7(*d*). More specifically, each calibration data set 140 includes three sets of calibration data for the respective three colors (red, green, and blue). In each set of calibration data, 256 numerical values Din (where D=R, G, B) are located at positions from a 0-th location to a 255-th location in association with corresponding original tone levels $D_{original}$ (where D=R, G, B) of 0 to 255. The calibration data shows that a color value (L, a, b) the same as each tone level $D_{original}$ will be reproduced when a corresponding value Din is supplied to the printer 136. One set of standard calibration data 140 is selected during the calibration data setting routine of FIG. 8 and is set as calibration data 150 as will be described later.

A variety of methods are conceivable for preparing the standard data sets 142 and the standard calibration data sets 140. For example, when the personal computer 200 is being manufactured, then test charts 170 are formed as shown in FIG. 6(*b*) by controlling a variety of different printers under a variety of setting conditions using the single test data set 160 with one coordinate data set (x, y) in FIG. 6(*a*). Thus, test charts 170 are formed in correspondence with a plurality of image forming conditions. As a result, a plurality of test charts 170 are obtained in correspondence with all the plurality of image forming conditions. Each test chart 170 is then measured by a colorimeter 138 that corresponds to the coordinate data set (x, y) used. An a result, "n"number of color measurement data (L, a, b) are obtained from each test charts 170. The thus obtained "n" number of color measurement data (L, a, b) and the coordinate data set (x, y) are arranged as shown in FIG. 7(*b*) to prepare one not of standard data 142 that corresponds to each image forming conditions and to the used colorimeter 138. Then, several sets of standard data sets 142 are prepared, for each image forming condition, by using the same color measurement data (L, a, b) while differentiating the coordinate data (x, y).

In order to obtain a set of standard calibration data 140 corresponding to each image forming condition, first, the color measurement data set (L, a, b) is retrieved from one of the corresponding several standard data sets 140. Then, for each of the red color-printed patches with patch numbers P1–Pn/3, the color measurement data (L, a, b) is converted into a density value Rout that is defined in the RGB colorimetric system. Similarly, for each of the green color-printed patches with patch numbers Pn/3+1–P2*n*/3, the color measurement data (L, a, b) is converted into a density value Gout that is defined also in the RGB colorimetric system. Additionally, for each of the blue color-printed patches with patch numbers P2*n*/3+1–Pn, the color measurement data (La a, b) is converted into a density value Bout that is defined also in the RGB colorimetric system. As a result, for each color R, G, or B, a relationship, between the 256 input density levels Din (where D=R, G, B) and the corresponding output density levels Dout (where D=R, G, B), are obtained similarly to the Din-Dout relationship shown in FIG. 3(*c*). As a result, under the assumption that output density levels Dout (where D=R, G, B) have a linear relationship with the original density levels $D_{original}$ (where D=R, G, B), a relationship between all the 256 input density levels Din (where D=R, G, B) and corresponding original density levels $D_{original}$ (where D=R, G, B) is obtained for each color. By determining which input density level Din (where D=R, G, B) should be applied to the printer 136 in order to reproduce each of 256 original density levels $D_{original}$ (where D=R, G, B) of 0–256, the standard calibration data 150 is obtained as shown in FIG. 7(*d*). When the personal computer 200 is being manufactured, the thus prepared standard data sets 142 and corresponding standard calibration data sets 140 are stored in correspondence with each other.

With this configuration, standard calibration data 140 that reliably corresponds to each set of different image formation conditions can be stored in the hard disk drive 116. When the standard calibration data is used as calibration data for converting original image data $D_{original}$ into image formation data Din, then a tone image that in faithful to the original image data $D_{original}$ can be formed on recording medium.

Figure 8:
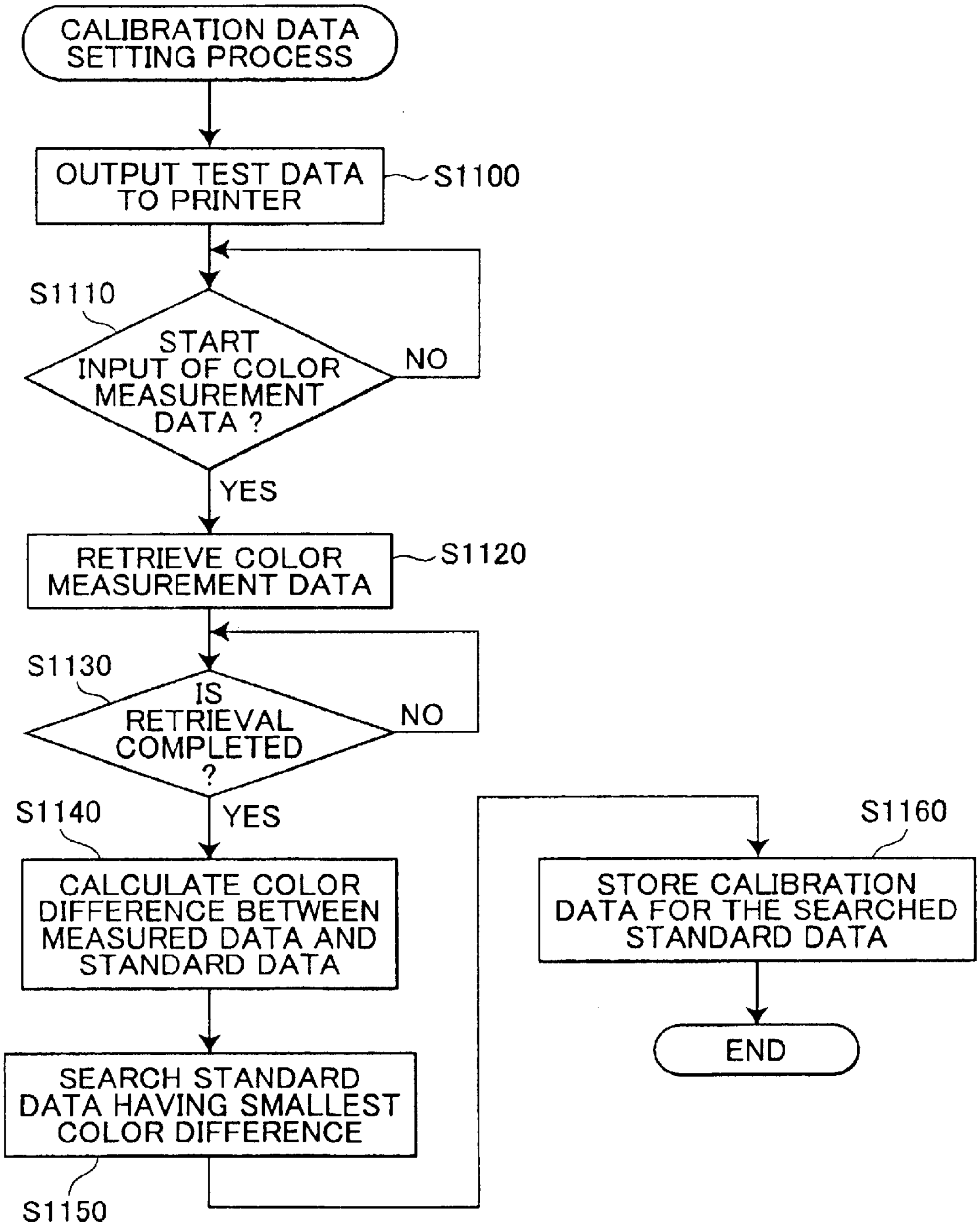
FIG. 8 is a flowchart representing a calibration data setting routine according to the second embodiment.

During the image formation process of FIG. 10, when the CPU 11 receives, from some upper rank program, an original tone level $R_{original}$ of "200," for example, the CPU 11 retrieves one numerical data Rin from the 200-th location in the calibration data 150, which is one set of standard calibration data 140 that is selected during the calibration data setting routine of FIG. 8, and supplies the retrieved data Rin to the printer 136. As a result, the printer 136 will print a color that actually ham a color value that is substantially the awe as a color value indicated by the original tone level $R_{original}$ of "200" if it is measured.

With the above-described structure, the computer 200 executes the calibration data setting process to control the printer 136 to actually print a test chart using the basic test chart data 160 and to select one standard data 142, thereby setting corresponding standard calibration data 140 as new calibration data 150.

The calibration data setting process is executed by the CPU 110 when the user inputs a command to execute this process from an external source such an a keyboard 130 or a mouse 132.

As shown in FIG. 8, when the calibration data setting routine is started, first in S1100, the test chart data 160, with one set of coordinate data (x, y) for the colorimeter 138 to be used, is retrieved from the hard disk drive 16 and is outputted to the printer 136. As a result, the printer 136 prints the test chart 170 of FIG. 6(*b*) on a predetermined recording sheet under image formation conditions presently set in the printer 136. Next, the operator uses the colorimeter 138 to measure the colors of the printed test chart 170 and to produce color measurement data 146 (where D=R, G, B) for all the patches. The colorimeter 138 inputs the thus produced color measurement data 146 shown in FIG. 9 into the personal computer 2. The color measurement data 146 includes a numerical value set (L*, a*, b*) for each patch number P1 to Pn (where n=768, in this example) of the test chart 170 according to the L*a*b* color system (CIE 1976).

Accordingly, after inputting the test chart data 160 to the printer 136, the routine then waits for the colorimeter 138 to output the color measurement data 146 in S1110. Once input of color measurement data 146 has started (S1110:YES), then in S1120 the color measurement data 146 is received and stored in the RAM 114. The color measurement data 146 is continued to be written into the RAM 114 until input of the color management data 146 has been completed. When input is completed, the retrieval operations of the color measurement data is ended (S1130:YES).

When retrieval of the color measurement data has been completed, then in S1140 calculations are performed to determine, for each patch number (P1–Pn), difference in color between the color measurement data 146 (FIG. 9) and is each set of standard data 142 (FIG. 7(*b*)). This difference ΔE*ab in color, for each patch number, can be determined using the following formula:

$$\Delta E^*ab=\sqrt{(L^{*\prime}-L^*)^2+(a^{*\prime}-a^*)^2+(b^{*\prime}-b')^2}$$

where L*', a*', b*' are in a data set of one patch number in each set of standard data 142, and L*, a*, b* are in a data set of a corresponding patch number in the color measurement data 146.

For each standard data set 142, the color differences ΔE*ab determined for all the patch numbers P1–Pn in S1140 are successively stored in the RAM 114 in the order determined, and are stored in correspondence with the corresponding standard data sets 142.

Once the color differences ΔE*ab, for all the patch numbers P1–Pn, between the color measurement data 146 and all the sets of standard data 142 are obtained, then in S1150 one set of standard data 142 that has the lowest color difference ΔE*ab among all the color differences ΔE*ab stored in the RAM 114 is searched for. In S1160, one standard calibration data 140 that corresponds to the standard data 142 searched for in S1150 is retrieved from the hard disk drive 116 by referring to a reference number that is set in the searched standard data set 142. The retrieved standard calibration data 142 is stored in the hard disk drive 116 as new calibration data 150 that corresponds to the present image formation conditions of the printer 136.

As described above, according to the present embodiment, the calibration data setting device 200 is prestored with: the test chart data 160 for forming the test chart 170, the plurality of standard data sets 142 which are to be used for calculating color differences with respect to colors actually measured from the test chart 170, and the plurality of standard calibration data sets 140 that each corresponds to several ones in the standard data sets 142. In order to set calibration data, then in S1100, test data 160 is outputted to the printer 136, whereupon the printer forms the test chart 170. When color measurement data 146 is inputted from the colorimeter 138 that measures colors of the test chart 170, then this inputted color measurement data 146 is written into the RAM 114 in S1110 to S1130. Then, in S1140, the difference between the color measurement data 146 and each set of standard data 142 in calculated. In S1150–S1160, one standard calibration data set 140 that corresponds to the standard data set 142 with the lowest color difference from the measurement data is searched for. The standard calibration data set 140 searched for and found is set an the calibration data 150 that will be used when converting image data later on.

The thus set calibration data 150 will be used when converting original image data $D_{original}$ into image formation data Din to control the printer 136 to form images on a recording medium.

More specifically, when printing is performed thereafter, the image formation program shown in FIG. 10 is retrieved from the ROM 112, and is executed by the CPU 110.

During the printing process, the CPU 110 first retrieves, in S2131, calibration data 150 from the HDD 116 and writes the calibration data 140 into the RAM 114. Then, in S2132, the CPU 11 receives original tone level data $D_{original}$ (where D=R, G, B) included in image data, supplied from a desired upper rank program, and converts the original level data $D_{original}$ (where D=R, G, B) into input level data Din (where D=R, G, B) using the retrieved calibration data 150. Then, in S2133, the CPU 11 outputs the input level data Din (where D=R, G, B) to the printer 136, thereby allowing the printer 136 to print the tone level designated by the original level data Din (where D=R, G, B). That is, if color values (L, a, b) are measured from a print output actually obtained by the printer 136, the measured color values (L, a, b) will properly match color values indicated by the original tone levels Din (where D=R, G, B).

Thus, the printer 136 is used to print out a new test chart 170 each time the image formation conditions of the printer 136 are changed. By calculating the color differences between the measured color data, obtained by measuring the tent chart 170 using the colorimeter 138, and each of the plurality of standard data sets 142, then one net of standard calibration data 140 that corresponds to the present image formation conditions of the printer 136 can be retrieved from the hard disk drive 116 based on the standard data set 142 with the lowest color difference. Therefore, the calibration data 150 can be updated in a short time without any complicated calculations.

Accordingly, the configuration of the personal computer 200 and also the process program of FIG. 8 used in the personal computer 200 can be simplified, so that cost for producing the personal computer 200 can be reduced. Also, the user can perform image processing operations more efficiently.

The present embodiment is not limited to the above description. The following five modifications are possible.

Modification 1

As shown in FIG. 11(*a*), each of the plurality of standard data sets 142, corresponding to a different set of image formation conditions, can have color density R', G', or B' for each patch number P1 to Pn. That is, each standard data set 142 has red density values R' for patch numbers P1–Pn/3, green density values G' for patch numbers Pn/3+1–P2*n*/3, and blue density values B' for patch numbers P2*n*/3+1–Pn.

In this case, during the calibration data setting routine of FIG. 8, the colorimeter 138 in controlled to measure the color on the test chart 170 and to output color measurement data 146 that numerically represents the corresponding density (R, G, or B) of color on each patch P1 to Pn as shown in FIG. 11(*b*). That is, the color measurement data set 146 has red density values R for patch numbers P1–Pn/3, green density values G for patch numbers Pn/3+1–P2*n*/3, and blue density values B for patch numbers P2*n*/3+1–Pn.

Then, the calculations in S1140 are performed, for all the patches P1–Pn, to determine density differences between measured values R, G, B in the measured color data 146 and corresponding values R, G, B in each of the plurality of standard data sets 142. Further, in S1150 one standard data set 142 is searched for with the smallest density difference from the color measurement data 146. With this configuration, the calibration data 150 can be set quickly without complicated calculations.

Modification 2

It can be assumed that input levels Din (where D=R, G, B) of the test chart data 160, inputted from the personal computer 104 to the printer 136, can be numerically represented by a level value L. It is further assumed that the colors of the test chart 170 printed by the printer 136 are measured by the colorimeter 138, and the density of color corresponding to each patch number P1 to Pn can be represented numerically by a density value D. In such a case, the density value D can be represented in a secondary approximate expression such as $D=AL^2+BL+C$ using the level value L, wherein A, B, and C are coefficients.

In order to prepare a standard data set 142 for each printing condition, therefore, the relationship, between the n number of level values L' in the test chart data 160 and corresponding n number of density values D' measured, are determined for all the patch numbers P1–Pn using n number of secondary approximate expressions described above. This determination is performed for each image forming condition. Then, for each image forming condition, coefficients A', B', C' are determined by comparing the n number of approximate expressions. The determined coefficients are A', B', C' set as a corresponding standard data set 142. That is, the coefficients A', B', C' are included in each standard data set 142.

In this case, during the calibration data setting routine of FIG. 8, in S1110, level values L (=Din (where D=R, G, B) in the test data 160, outputted to the printer 136 to produce all the patch numbers P1 to Pn, are stored in the RAM 114. Further, the colorimeter 138 is controlled to measure colors of the test chart 170 printed by the printer 136. The density values D (=Dout (where D=R, G, B)) of colors corresponding to all the patch numbers P1 to Pn are then obtained as color measurement data. Then, coefficients A, B, C are determined by using n number of secondary approximate expressions based on the level values L and the density values D for all the patch numbers P1–Pn, and by comparing the n number of secondary approximation expressions. In S1140, calculations are performed to calculate the differences between the coefficients A, B, C obtained from the color measurement data and the coefficients A', B', C' in each set of the standard data sets 142. Next, in S1150, one standard data set 142 that has a smallest difference in its coefficients (A', B', C') with the measurement data (A, B, C) is searched for. In this way also, the calibration data 150 can be set quickly without complicated calculations.

These coefficients A (A'), B (B'), C (C') can be set with different levels of importance, and comparison for all the coefficients can be performed according to the set levels of importance. For example, the value of A (A') can be set with the level of importance ten (10), value B (B') can be set with the level of importance three (3), and value C (C') can be set with the importance value of one (1). The values A, B, C in the color measurement data 146 and the values A', B', C' in the standard data 142 can be conned according to this weighting. Thus, the levels of importance can be used as rates for being used to perform comparison calculations for values A, B. C.

Modification 3

In this modification, during S1140, the color differences ΔE*ab between the color measurement data 146 and each set of standard data 142 are determined for all patch numbers P1 to Pn, and then an average value of all the color differences ΔE*ab is calculated and stored in the RAM 114. Then in S1150, one set of standard data 142 that has the lowest average value for its color differences ΔE*ab is searched for. With this configurations also, the calibration data can be quickly set without complicated calculation processes.

Alternatively, as each standard data set 142, an average value of color values (L, a, b) for all the patch numbers P1 to Pn in FIG. 7(*b*) can be determined. During the routine of FIG. 8, an average value of color values (L, a, b) for all the patch numbers P1 to Pn is determined based on the color measurement data 146 (FIG. 9) from the test chart 170. A difference between the average value of the color measurement data 146 and the average value in each set of standard data 142 to calculated. Then in S1150 one standard data set 142 with the lowest difference in the average value of color values can be searched for. In this case also, the same efforts can be obtained as when comparing the differences ΔE*ab for all the patch numbers.

This modification 3 can be applied to the above-described modification 1. That is, in modification 1, in each standard data set 142, an average value of density values on all the patch numbers P1 to Pn in FIG. 11(*a*) can be determined as the set of standard data 142. An average value of density values for all the patch number P1 to Pn is determined based on the color measurement data 146 (FIG. 11(*b*)) from the test chart 170. A difference between the average value of the measured data 146 and the average value in each set of standard data 142 is calculated. Then in S1150 one standard data set with the lowest difference in the average value of color densities can be searched for. In this case also, the same effects can be obtained 85 when comparing the differences ΔE*ab for all the patch numbers.

Modification 4

In S1140 the differences in color ΔE*ab between the color measurement data 146 and the plurality of standard data sets 142 are determined only for a particular patch number among all the patch numbers P1–Pn, and the determined results are stored in the RAM 114. In S1150, one standard data set that has the smallest color difference color ΔE*ab is searched for. In this case also, the calibration data can be set quickly without complicated calculation processes.

For example, each set of standard data 142 can be set with a Lab color value only for a particular patch number. In this case, the Lab color value of color corresponding only to the same particular patch number is retrieved from the color measurement data 146. In S1150, one standard date set with the lowest difference between the standard data and the actually measured color value is searched for.

This modification 4 can also be applied to the modification 1. That is, in the modification 1, each set of standard value 142 can be set with a density value only for a particular patch number. In this case, the density value of color corresponding only to the same particular patch number can be retrieved from the color measurement data 146. In S1150, one standard data set with the lowest difference between the standard data and the actually measured density values is searched for.

Modification 5

In S1140, the color difference ΔE*ab may be determined for some patch numbers, within a particular range, between the color measurement data 146 and each set of standard data 142, and the determined values stored in the RAM 114. In S1150, one set of standard data 142 with the smallest color difference ΔE*ab is searched for. In this way also, calibration data can be determined quickly without complicated calculations.

For example, each set of standard data 142 may be set with color values (L, a, b) corresponding only to some patch numbers within the particular range. Also, the color values (L, a, b) of colors corresponding only to the patch numbers within the particular range are used an color measurement values of the test cort 170. In S1150, one set of standard data 142 is searched for that has a smallest difference with the measured color values.

This modification 5 can be applied to the modification 1. That is, in the modification 1, each set of standard data 142 may be set with density values of colors corresponding only to some patch numbers within the particular range. Also, the density values of colors corresponding only to the patch numbers within the particular range are used as color measurement values of the test chart 170. In S1150, one set of standard data 142 is searched for that has a smallest difference with the measured density values. This configuration also has the same effects as when comparing color difference ΔE*ab of patch numbers within the particular range.

Patches in intermediate tones with the densities in the vicinity of 50% can be included in the particular patch range. The intermediate tones are known to be easily influenced by fluctuation in color caused by changes in the image formation characteristic of the image forming device, such as the printer 136. For this reason, by comparing standard data 142 with color measurement data 146 for patches in the particular range that includes the vicinity of 50% densities, then the density differences or color differences appear more striking than when patches of tones other than the intermediate tones are used for comparison. Therefore, it is possible to set calibration data near to the image formation conditions or the image formation characteristic actually being presently used.

A tone characteristic data setting device according to a third embodiment of the present invention will be described below with reference to FIGS. 12–14.

The third embodiment is provided to enable setting of tone characteristic data or calibration data only when the setting is necessary.

Figure 12:
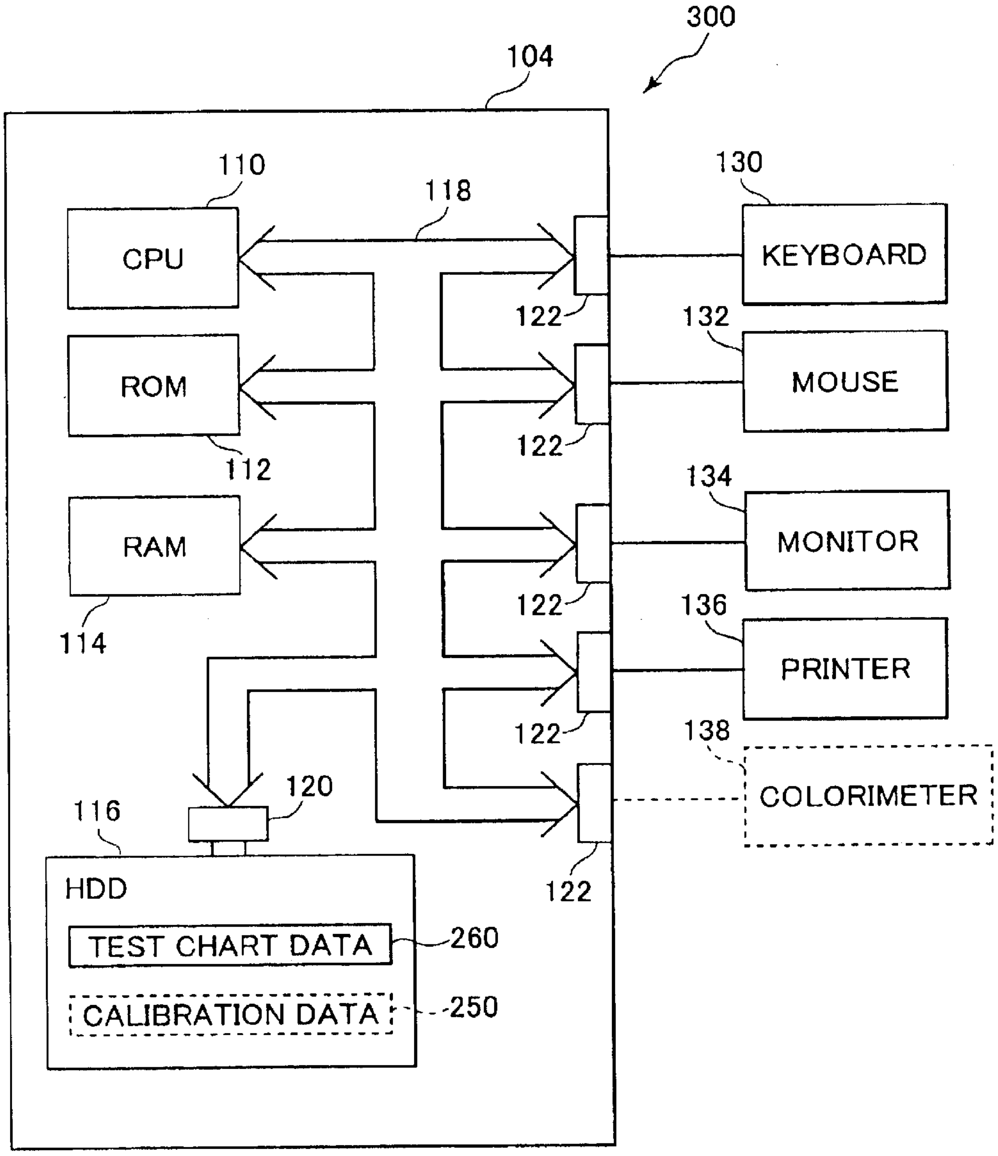
FIG. 12 is a block diagram showing essential components of a personal computer according to a third embodiment of the present invention.

A computer 300 that includes the tone characteristic data setting device of the present embodiment can be constructed an shown in FIG. 12. The structure of the computer 300 to the same an that of the computer 200 in the second embodiment except that the hard disk drive 116 stores a set of observation test chart data 260 and a not of calibration data 250, instead of storing the basic standard data sets 142, the standard calibration data sets 140 and the calibration data set 150.

Figure 14:
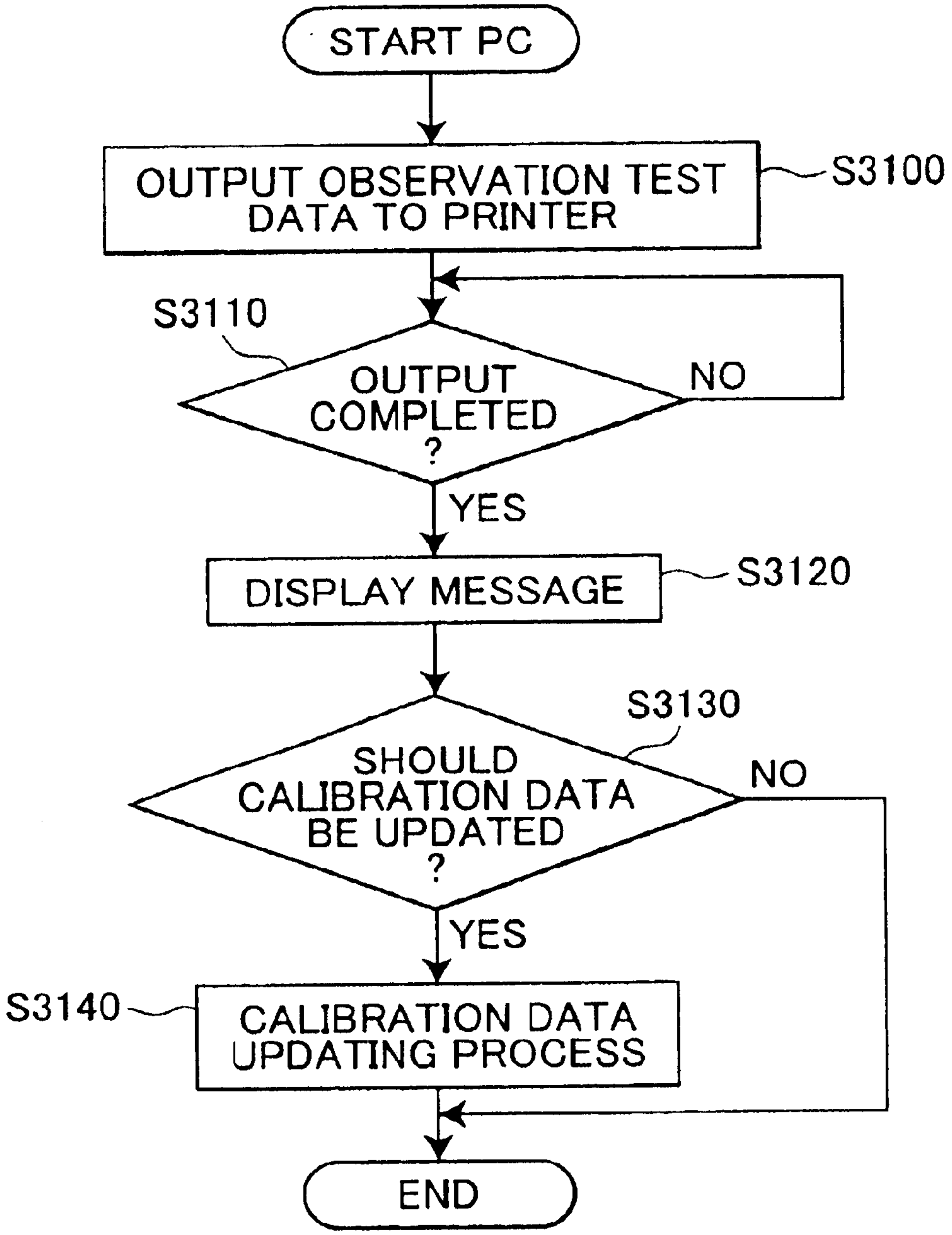
FIG. 14 is a flowchart representing a calibration data setting routine according to the third embodiment.

According to the present embodiment, the computer system 300 of FIG. 12 executes the calibration file updating process shown in FIG. 14, instead of executing the calibration data updating process shown in FIG. 8. That is, a calibration data updating program shown in FIG. 14 is stored in the HDD 116.

It is noted that according to the present embodiment, the printer 136 is a color printer that is capable of forming images on a recording medium using four colors of ink, that is, black ink, cyan ink, magenta ink, and yellow ink in the same manner as the printer 2 in the first embodiment.

The colorimeter 130 is of a type that measures intensity of light transmitted through or reflected from an object being measured, and outputs a color value (X, Y, Z) defined in the XYZ colorimetric space (CIE 1931 colorimetric system) as color measurement data.

The HDD 116 further stores an image formation program similar the same as that of FIG. 10 in the second embodiment. That is, when CPU 110 receives original tone level data (original pixel data) $D_{original}$ (where D=C, M, Y, K, in this embodiment) from an upper rank program such as some application program, the CPU 110 then converts the original tone level data $D_{original}$ (where D=C, M, Y, K) into input tone level data Din (where D=C, M, Y, K, in this embodiment). The CPU 11 performs this conversion in accordance with commands inputted from an external source and based on the calibration data 250 stored in the HDD 116. The CPU 110 supplies the input level data Din (where D=C, M, Y, X) to the printer 136, whereupon the printer 136 prints images on a desired recording sheet.

According to the present embodiment, the calibration data setting process (FIG. 14) is designed to first control the printer 136 using the observation test data 260 to print on observation tent chart 240 (FIG. 13) so that the operator can visually evaluate whether calibration data 250 presently used should be updated or not, and to update the present calibration data only when the evaluation results shows that updating is necessary.

The calibration data 250 has a data structure the sa as shown in FIG. 2(*b*) in the first embodiment.

Figure 13:
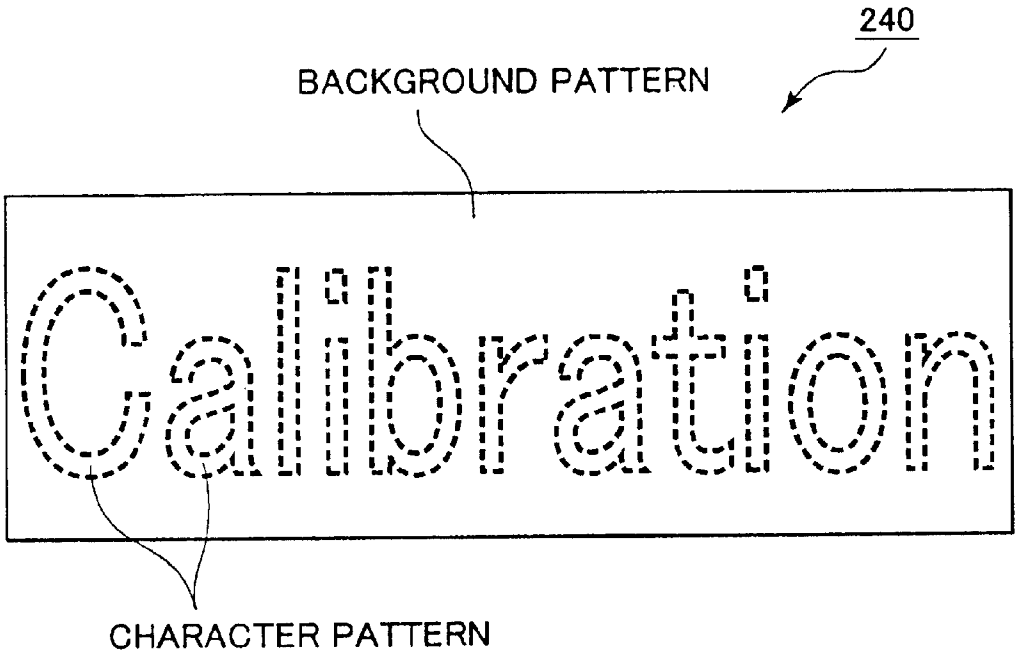
FIG. 13 shows an observation test chart printed according to the third embodiment.

The observation test data 260 includes original tone level data $D_{original}$ (D=C, M, Y, K) for forming an observation test chart 240 as shown in FIG. 13.

More specifically, the observation test chart data 260 is prepared for forming a predetermined character pattern, for example "calibration" as shown in FIG. 13. The observation test chart data 260 forms the character pattern in a predetermined image forming region (indicated in a frame in FIG. 13) on a recording sheet. The observation test data 260 is set to print the character pattern using black ink in an intermediate tone that is 50% black, or gray color, and to print the background of the character pattern, that is all portions other than the character pattern itself, using a combination of cyan, magenta, and yellow ink in the same color as the character pattern itself. In other words, if the computer 104 converts the original tone levels $D_{original}$ (D=C, M, Y, K) in the observation test data 260 into input tone levels Din (D=C, M, Y, K) using a predetermined standard calibration data 250, and supplies the input tone levels Din to the printer 136, thereby controlling the printer 136 to print the test chart 240 on a predetermined recording sheet, and if the printer 136 is in a predetermined standard printing characteristic that corresponds to the predetermined standard calibration data 250, the color of the background pattern becomes exactly the same as that of the character pattern, and therefore the operator should not be able to read the character pattern on the test chart 240.

Even when the printing characteristic of the printer 136 changes from the standard printing characteristic, if the calibration data 250 in the HDD 116 is also updated into a state that properly corresponds to the present printing characteristic, an observation test chart 240 that to obtained by converting the original tone levels $D_{original}$ (D=C, M, Y, K) in the observation test data 260 into input tone levels Din (D=C, M, Y, K) using the updated calibration data 250 will reproduce colors so that the color of the background pattern is still exactly the same with that of the character pattern, and therefore the operator should not be able to read the character pattern on the test chart 240.

The observation test data 260 is produced in a manner described below.

First, a standard printer 136 in the predetermined standard printing characteristic is used to print a square pattern, such as 2 mm by 2 mm square in an intermediate tone, such as 50% black, on a print medium with black ink. Then, the colorimeter 138 is used to measure color of the 50% black pattern, and to produce color measurement data CK 50%=($X_{50}$, $Y_{50}$, $Z_{50}$) represented by the XYZ colorimetric system (CUE 1931 color system).

Then, the printer 136 is again used to print a plurality of patterns, in the same size as the black 50% pattern, in each of a plurality of colors, including: white (the same color with the print medium), cyan ink, magenta ink, yellow ink, a combination color of three colors of cyan, magenta, yellow in a laminated condition, red, green, and blue. These patterns are measured using the colorimeter 130, as a result of which the colorimeter 138 produces a plurality of color measurement data Cw, Co, Cm, Cy, C3c, Cr, Cg, Cb that are represented also by XYZ color system (CIE 1631 color system).

That in, the color measurement data sets obtained for all the colors are represented by: Cw=(Xw, Yw, Zw), Cc=(Xc, Yc, Zc), Cm=(Xm, Ym, Zm), Cy=(Xy, Yy, Zy), C3c=(X3c, Y3c,Z3c), Cr=(Xr, Yr, Zr), Cg=(Xg, Yg, Zg), and Cb=(Xb, Yb, Zb), respectively.

In the observation test chart 240, the character pattern is printed using 50% black ink, whereas the background pattern is used by laminating cyan ink, magenta ink, yellow ink to emulate the same color as the 50% black ink. It is assumed that the amount of each color ink (cyan, magenta, and yellow ink) used for forming the background pattern is represented as InkC, InkM, and InkY, wherein 0≦InkC, InkM, InkY≦1 where 1 is the maximum amount of ink ejected during printing, and 0 is no ink ejection.

It is further assumed that the background pattern is to be produced by white color (color of the recording material, cyan ink color, magenta ink color, yellow ink color, 3C ink color (a combination of laminated colors of cyan, magenta, and yellow), red, green, and blue color with their surface area ratios represented by aw, ac, am, ay, a3c, ar, ag, ab respectively.

The surface area ratios aw, ac, am, ay, a3c, ar, ag, ab, which should be set to corresponding colors in the background pattern, and the amounts InkC, InkM, InkY of ink which should be used in the background pattern can be determined in the following simultaneous equations (1) to (11):

$$X_{50}=aw*Xw+ac*Xc+am*Xm+ay*Xy+a3c*X3c+ar*Xr+ag*Xg+ab*Xb \quad (1)$$

$$Y_{50}=aw*Yw+ac*Yc+am*Ym+ay*Yy+a3c*Y3c+ar*Yr+ag*Yg+ab*Yb \quad (2)$$

$$Z_{50}=aw*Zw+ac*Zc+am*Zm+ay*Zy+a3c*Z3c+ar*Zr+ag*Zg+ab*Zb \quad (3)$$

$$aw=(1-InkC)*(1-InkM)*(1-InkY) \quad (4)$$

$$ay=(1-InkC)*(1-InkM)*Inky \quad (5)$$

$$am=(1-InkC)*InkM*(1-InkY) \quad (6)$$

$$ac=InkC*(1-InkM)*(1-InkY) \quad (7)$$

$$ar=(1-InkC)*InkM*InkY \quad (8)$$

$$ag=InkC*(1-InkM)*InkY \quad (9)$$

$$ab=InkC*InkM*(1-InkY) \quad (10)$$

$$a3c=InkC*InkM*InkY \quad (11)$$

The values of aw, ac, am, ay, a3c, ax, ag, ab, InkC, InkM, and InkY determined using the above simultaneous equations (1) to (11) can control the printer 136, which is in the predetermined standard printer characteristic, to print the background pattern in exactly the same an the 50% black pattern. Original tone data $D_{original}$ (D=C, M, Y, K) in the observation test data 260 is produced based on the above-determined values so that when the original tone data $D_{original}$ (D=C, M, Y, K) in the observation test data 260 be converted into input tone data Din (D=C, M, Y, K) according to the predetermined standard calibration data 250, the obtained input tone data Din will properly control the printer 136 in the standard printing characteristic, to reproduce the background pattern and the character pattern in exactly the same color.

Next, an explanation will be provided for the calibration data updating process, that is executed by the CPU 110, with reference to the flowchart shown in FIG. 14. The program for executing the calibration data updating process is stored in the hard disk drive 116 as one of various start programs for the personal computer 300 so that the program will be run when the personal computer 300 is started. For this reason, the calibration data updating processes will always be executed directly after the personal computer 300 is started up. Additionally, the calibration data updating processes can be executed when the user commands execution of this process according to necessity.

As shown in FIG. 14, when this routine is started, first in S3100, the observation test data 260 ($D_{original}$ (where D=C, M, Y, K)) is retrieved from the hard disk drive 116, converted to print data Din (where D=C, M, Y, K) based on the calibration data 250 presently set in the HDD 116, and then outputted to the printer 136. Then, in S3110, the CPU 110 judges whether or not all the observation test data 260 have been inputted to the printer 136.

With this routine, the printer 136 prints the observation test chart 240 on a recording sheet preset in the printer 136. The user visually determines whether the test chart is printed well to determine whether the presently-set calibration data needs to be updated or not. Therefore, when this is confirmed that the observation test data 260 has been completely inputted (S3110:YES), then in S3120, a message urging the user to input his or her visual evaluation of the observation test chart is displayed on the monitor 134. For example, the message "should calibration be performed?" can be displayed on the monitor 134.

In S3130, the routine waits for the user to operate, according to the displayed message, the mouse 132 or the keyboard 130 to indicate necessity of updating the calibration data. If the observation test chart 240 is properly printed and the word "calibration" does not appear on the test chart, so the user commands that the calibration data need not be updated (S3130:140), then this routine is ended. On the other hand, if the test chart 240 is poorly printed and therefore the word "calibration" appears on the test chart, so the user inputs a command indicating that the calibration data should be updated (S3130:YES), then the routine proceeds to S3140 whereupon the calibration data is updated and afterward the routine is ended.

The routine for updating the calibration data is performed in S3140 in the same manner as in S104 of the first embodiment. More specifically, in response to the command from the user, print data Din (where D=C, M, Y, K) for printing the test chart of FIG. 3(*b*) is first inputted to the printer 136. The test chart to printed on a predetermined printing sheet. Afterward, the user sets the printed test chart in the colorimeter 138. In this case, the colorimeter 138 is controlled to output its color measurement data in set color components of C, M, Y, K in the same manner as in the first embodiment. When the color measurement data Dout (where D=C, M, Y, K) of the test chart is inputted to the computer 104 from the colorimeter 138, then calibration data 250 as shown in FIG. 2(*b*) that corresponds to the present characteristic of the printer 136 is determined. The calibration data 25D shows which print data Din (where D=C, Y, Y, K) can control the printer 136 in the present state to reproduce each of 256 original tone data $D_{original}$ (where D=C, M, Y, K) of 0–255. The thus obtained calibration data 250 is then written over the calibration data 250 already existing in the hard disk drive 116.

As described above, according to the present embodiment, the observation test chart, which enables visual distinction whether calibration data needs to be updated, is printed according to a command from a user or automatically in conjunction with start up of the device 300. The observation test chart includes the character pattern and the background pattern. The character pattern is printed in an intermediate color using black ink. The background pattern is printed to match the intermediate color of the character pattern by adjusting composition of different inks (cyan, magenta, yellow). When the calibration data now set in the device 300 to print the observation test chart deviates from the present characteristic of the printer, then the character will appear in the printed test chart so that the user can visually determine whether or not the calibration data needs to be updated.

It is noted that when the device 300 is originally shipped from a manufacturer, the HDD 116 originally stores the set of standard calibration data that has been used to produce the observation test data 260. Accordingly, at least until the standard calibration data is written over with new calibration data during the updating routine of FIG. 14, the observation test chart 240 to printed by converting the observation test data 260 ($D_{original}$) using the standard calibration data. When the characteristic of the printer 136 deviates from the standard characteristic corresponding to the standard calibration data, the standard calibration data is updated to new calibration data during the updating routine of FIG. 14. Thereafter, the new calibration data will be used for converting the observation test data 260 until the characteristic of the printer 136 further changes and therefore calibration data is further updated.

Thus, the observation test chart formation operations are executed either when the personal computer 300 is first started up or when a command is received from the user. The printer 136 then prints the observation test chart 240 for visual confirmation of whether or not the calibration data needs to be updated. The observation test chart has, in the predetermined image formation region on the recording sheet, several areas to present a character pattern corresponding to the predetermined character train. The character pattern and the background pattern are printed in the same intermediate tone by changing composition of ink or image formation material.

Accordingly, the user will be unable to distinguish the character pattern from the background pattern when the printer characteristic matches with the presently-set calibration data 250 and therefore the observation test chart 240 is properly printed. On the other hand, when the printer characteristic fails to match the present calibration data 250 and therefore the observation test chart 240 is poorly printed, then the user will be able to clearly see the character pattern by the differences in color between the character pattern and the background pattern. With this configuration, the user can tell how well the observation test chart is printed by merely glancing at the observation test chart. Therefore, by merely glancing at the observation test chart, the user can determine whether or not the calibration data needs to be updated. Therefore, operations for setting the calibration data using the calorimeter 138 can be performed only when needed. The user can determine whether or not the calibration data needs to be updated by visually confirming how well the observation test chart is printed by the printer 136. There is no need to perform complicated operations, such as required for setting calibration data. The burden placed on the user is reduced so that the user can operate with improved efficiency.

In the above description, the observation test chart 240 is configured from the background pattern and the character pattern that is formed from the character train, such as the word "calibration". However, the observation test chart is not listed to characters, but instead on include any combination of symbols, marks, or other particular figures.

Also, in the above description, amounts of respective inks used awe adjusted in order to print the character pattern in the same color as the background pattern. However, each pattern, such as the character pattern and background pattern, can be printed in different colors an long as whether the printing results are good or not can be visually determined.

In the above description, the computer 300 has a function of both an image processing device and a calibration setting device. That is, the computer 300 can operate to set calibration data and to convert image data $D_{original}$, from an upper rank program, into image formation data Din using the calibration data. However, the function of the calibration data setting device can be incorporates into the image forming device, such as the printer or a copy machine, itself.

While the invention has been described in detail with reference to the specific embodiments thereof, it would be apparent to those skilled in the art that various changes and modifications may be made therein without departing from the spirit of the invention.

For example, in the above-described embodiments, the calibration data is produced for the printer. However, the calibration data can be produced for other types of image formation devices such as a display. In such a case, the display is controlled by the input tone levels Din to form a plurality of color patches, and the formed color patches are measured to obtain output levels Dout. Based on the obtained measurement values Dout and the input levels Din, the calibration data is produced.

In the first embodiment, the user may be allowed to optionally select the user's desired correct file or the user's desired preserved file for printing. In the second embodiment, the user may be allowed to select a desired standard data set 142 and accordingly to select a desired standard calibration data set 140 to update the present calibration data 150.

What is claimed is:

1. A tone characteristic setting device for setting tone characteristic to be used for converting original tone data into input tone data to be supplied to an image formation device, the tone characteristic setting device comprising:

a memory storing data of tone characteristic of an image formation device;

a test chart production control unit that controls the image formation device to produce a test chart, the test chart production control unit controlling the image formation device to produce the test chart that has several regions within a single image formation area, the test chart production control unit controlling the image formation device to produce images in the several regions by changing at least one of coloring material and composition of coloring material;

a control unit controlling the test chart production control unit to control the image formation device to produce a test chart, thereby enabling a user to visually confirm the test chart; and a characteristic setting unit setting tone characteristic, the characteristic setting unit including:

an input unit enabling the user to input his/her observation result; and a characteristic setting operation executing unit executing, in response to the input of the observation result, an operation to set tone characteristic indicative of the present characteristic of the image formation device.

2. A tone characteristic setting device for setting tone characteristic to be used for converting original tone data into input tone data to be supplied to an image formation device, the tone characteristic setting device comprising:

a memory capable of storing data of tone characteristic of an image formation device;

a tone characteristic producing unit that produces main tone characteristic data by executing a tone characteristic production operation to input data of a plurality of input levels to the image formation device to control the image formation device to produce a plurality of tone patches, to control a tone measurement device to measure tones of the plurality of tone patches and to produce data of a plurality of output levels indicative of the measured tones of the tone patches, and to produce the main tone characteristic data based on a relationship between the output levels and the corresponding input levels;

a storing unit that stores the main tone characteristic data in the memory while allowing the memory to maintain auxiliary tone characteristic data; and a setting unit that includes a retrieving unit that retrieves either one of the main tone characteristic data and auxiliary tone characteristic data to set the retrieved tone characteristic data as indicative of the characteristic of the image formation device.

3. A tone characteristic setting device as claimed in claim 2, wherein the storing unit stores, in the memory, a set of main tone characteristic data that is produced in the present tone characteristic production operation, while allowing the memory to maintain, as the auxiliary tone characteristic data, another set of main tone characteristic data that has been produced by the tone characteristic producing unit during another tone characteristic production operation that is executed prior to the present tone characteristic production operation.

4. A tone characteristic setting device as claimed in claim 2, wherein the storing unit stores, in the memory, a set of main tone characteristic data that is produced in the present tone characteristic production operation, while allowing the memory to maintain, as the auxiliary tone characteristic data, another set of main tone characteristic data that has been produced by the tone characteristic producing unit during another tone characteristic production operation that is executed before the tone characteristic setting device is shipped from a manufacturer.

5. A tone characteristic setting device as claimed in claim 2, wherein the storing unit stores, in the memory, a set of main tone characteristic data that is produced in the present tone characteristic production operation when the image formation device is set in a present image forming condition, while allowing the memory to maintain, as the auxiliary tone characteristic data, another set of main tone characteristic data that has been produced by the tone characteristic producing unit during another tone characteristic production operation that is executed when the image formation device is set in another image forming condition different from the present image forming condition in at least one of a model of the image formation device, a kind of image formation material, a type of a medium, an image resolution, and an image formation speed employed in the image formation device.

6. A tone characteristic setting device as claimed in claim 5, wherein the storing unit allows the memory to maintain, as a plurality of sets of auxiliary tone characteristic data, a plurality of sets of main tone characteristic data that have been produced for a plurality of image forming conditions, and wherein the retrieving unit retrieves either one set from the plurality of sets of auxiliary tone characteristic data according to a priority that is previously determined based on a combination of matching conditions.

7. A tone characteristic setting device as claimed in claim 2, wherein the storing unit stores, in the memory, a set of main tone characteristic data that is produced in the present tone characteristic production operation for a present image formation device, while allowing the memory to maintain, as the auxiliary tone characteristic data, another set of main tone characteristic data that has been produced by the tone characteristic producing unit during another tone characteristic production operation that is executed for another image formation device of the same model type of the present image formation device.

8. A tone characteristic setting device for setting tone characteristic to be used for converting original tone data into input tone data to be supplied to an image formation device, the tone characteristic setting device comprising:

a memory storing a plurality of sets of standard output value data and a plurality of sets of standard tone characteristic data, each standard output value data set corresponding to one of the plural sets of standard tone characteristic data; and a characteristic setting unit that includes:

an input unit that inputs data of a plurality of test input values to the image formation device, thereby controlling the image formation device to produce a plurality of tone patches;

a measurement control unit that controls a tone measurement device to measure tones of the plurality of tone patches, thereby producing a plurality of output values indicative of the measured tones of the tone patches;

a comparing unit that compares data of the plurality of output values with each set of standard output value data;

a selecting unit that selects one set of standard output value data based on the comparing results and selects one standard tone characteristic data set that corresponds to the selected standard output value data set; and a setting unit that sets the selected standard tone characteristic data as tone characteristic data for the image formation device.

9. A tone characteristic setting device as claimed in claim 8, wherein the selecting unit selects one set of standard output value data that has a smallest color difference from the plurality of output values.

10. A tone characteristic setting device as claimed in claim 8, wherein the selecting unit selects one set of standard output value data that has a smallest density difference from the plurality of output values.

11. A tone characteristic setting device as claimed in claim 8, wherein each set of standard output value data includes a single value, the comparing unit calculating an average value for the output values measured from all the tone patches, and comparing the average value with the single value of each standard output level data set.

12. A tone characteristic setting device as claimed in claim 8, wherein each set of standard output value data includes at least one value, the comparing unit selecting at least one output value of at least one intermediate tone from the plurality of output values measured from all the tone patches, and comparing the selected at least one output value with the at least one value in each standard output value data set.

13. A tone characteristic setting device as claimed in claim 12, wherein the at least one value corresponds to at least one intermediate tone.

14. A tone characteristic setting device as claimed in claim 1, further comprising a conversion unit that converts an original tone data into input tone data to be supplied to the image formation device according to the set tone characteristic data.

15. A tone characteristic setting device as claimed in claim 1, wherein the control unit includes an instruction input unit enabling the user to input an instruction to produce the test chart unit, upon receipt of the instruction, controlling the test chart producing unit to control the image formation device to produce the test chart.

16. A tone characteristic setting device as claimed in claim 15, wherein the memory further stores test data for producing the test chart.

17. A tone characteristic setting device as claimed in claim 16, wherein the test chart production control unit controls the image formation device to produce the test chart, thereby enabling the user to visually judge similarity in color between each image region in the test chart.

18. A tone characteristic setting device as claimed in claim 1, wherein the test chart production control unit controls the image formation device to produce the several regions to indicate some character pattern, thereby enabling the user to visually judge the character pattern on the test chart.

19. A tone characteristic setting device as claimed in claim 1, wherein the test chart production control unit controls the image formation device to produce the several regions to indicate some figure pattern, thereby enabling the user to visually judge the figure pattern on the test chart.

20. A tone characteristic setting device as claimed in claim 1, wherein the test chart production control unit inputs, to the image formation device, test data that presents, for the several regions, the same intermediate tones by changing at least one of coloring material and composition of coloring material.

21. A tone characteristic setting device as claimed in claim 15, wherein the control unit controls the test chart production control unit to control the image formation device to produce the test chart when the tone characteristic setting unit is powered ON.

22. A data recording medium storing a tone characteristic setting program for being read by a computer system to control the computer system to set tone characteristic data of an image formation device, the computer storing data of tone characteristic of the image formation device, the program comprising:

a program controlling the image formation device to produce a test chart, the test chart production control program controlling the image formation device to produce the test chart that has several regions within a single image formation area, the test chart production control program controlling the image formation device to produce images in the several regions by changing at least one of coloring material and composition of coloring material;

a program controlling the test chart production control program to control the image formation device to produce a test chart, thereby enabling a user to visually confirm the test chart; and a program setting tone characteristic, the characteristic setting program including:

an input program enabling the user to input his/her observation result; and a characteristic setting operation executing program executing, in response to the input of the observation result, an operation to set tone characteristic indicative of the present characteristic of the image formation device.

* * * * *